United States Patent
Racape et al.

(10) Patent No.: US 11,089,296 B2
(45) Date of Patent: Aug. 10, 2021

(54) METHOD AND APPARATUS FOR OMNIDIRECTIONAL VIDEO CODING AND DECODING WITH ADAPTIVE INTRA PREDICTION

(71) Applicant: INTERDIGITAL VC HOLDINGS, INC., Wilmington, DE (US)

(72) Inventors: Fabien Racape, Cesson-Sevigne (FR); Franck Galpin, Cesson-Sevigne (FR); Philippe Bordes, Cesson-Sevigne (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 16/334,100

(22) PCT Filed: Sep. 28, 2017

(86) PCT No.: PCT/EP2017/074672
§ 371 (c)(1),
(2) Date: Mar. 18, 2019

(87) PCT Pub. No.: WO2018/060358
PCT Pub. Date: Apr. 5, 2018

(65) Prior Publication Data
US 2019/0260989 A1 Aug. 22, 2019

(30) Foreign Application Priority Data
Sep. 30, 2016 (EP) ..................................... 16306269

(51) Int. Cl.
*H04N 19/105* (2014.01)
*H04N 19/11* (2014.01)
(Continued)

(52) U.S. Cl.
CPC ............. *H04N 19/105* (2014.11); *G06T 9/00* (2013.01); *H04L 65/607* (2013.01); *H04N 19/11* (2014.11);
(Continued)

(58) Field of Classification Search
CPC .... H04N 19/105; H04N 19/147; H04N 19/51; H04N 19/597; H04N 19/61;
(Continued)

(56) References Cited

U.S. PATENT DOCUMENTS

| 8,787,693 B2 | 7/2014 | Jung et al. |
| 2009/0196342 A1 | 8/2009 | Divorra Escoda et al. |

(Continued)

FOREIGN PATENT DOCUMENTS

| WO | WO2012095350 | 7/2012 |
| WO | WO2016064862 | 4/2016 |

OTHER PUBLICATIONS

Xiaohui Wei et al,Multiview video coding algorithm based on video relative object segmentation,25 Picture Coding Symposium, Beijing,Apr. 24, 2006.
(Continued)

*Primary Examiner* — Joseph W Becker
(74) *Attorney, Agent, or Firm* — Jamie T. Nguyen

(57) ABSTRACT

In omnidirectional videos, a straight line in the rendering space may no longer appear as a straight line in the frame to be encoded, due to the projection between the encoding space and the rendering space. To adapt to the geometry of omnidirectional videos, intra prediction is performed along non-straight curves. In particular, references samples in neighboring reconstructed blocks of a current block are copied along non-straight curves to form a predicted block for the current block. The non-straight curves may be computed online based on a single intra prediction direc- (Continued)

tional mode for the current block. The parameters of non-straight curves may be based on the mapping used in forming the omnidirectional videos, and the location/size of the current block. The non-straight curves may be obtained using a look-up table or an analytical function that is dependent on the location and size of the current block.

24 Claims, 19 Drawing Sheets

(51) Int. Cl.

| | | |
|---|---|---|
| *H04N 19/176* | (2014.01) | |
| *H04N 19/593* | (2014.01) | |
| *H04N 19/132* | (2014.01) | |
| *H04N 19/159* | (2014.01) | |
| *H04L 29/06* | (2006.01) | |
| *H04N 19/147* | (2014.01) | |
| *H04N 19/51* | (2014.01) | |
| *H04N 19/597* | (2014.01) | |
| *H04N 19/61* | (2014.01) | |
| *H04N 19/174* | (2014.01) | |
| *G06T 9/00* | (2006.01) | |
| *H04N 19/46* | (2014.01) | |

(52) U.S. Cl.
CPC ......... *H04N 19/132* (2014.11); *H04N 19/147* (2014.11); *H04N 19/159* (2014.11); *H04N 19/174* (2014.11); *H04N 19/176* (2014.11); *H04N 19/46* (2014.11); *H04N 19/51* (2014.11); *H04N 19/593* (2014.11); *H04N 19/597* (2014.11); *H04N 19/61* (2014.11)

(58) Field of Classification Search
CPC .... H04N 19/174; H04N 19/46; H04N 19/593; H04N 19/11; H04N 19/132; H04N 19/159; H04N 19/176; H04L 65/607; G06T 9/00

See application file for complete search history.

(56) References Cited

U.S. PATENT DOCUMENTS

| | | |
|---|---|---|
| 2009/0268810 A1 | 10/2009 | Dai |
| 2013/0301718 A1 | 11/2013 | Amon |
| 2016/0073107 A1 | 3/2016 | Moon et al. |
| 2016/0112489 A1 | 4/2016 | Adams et al. |
| 2016/0112704 A1 | 4/2016 | Grange et al. |
| 2016/0112705 A1 | 4/2016 | Mukherjee |
| 2016/0112713 A1 | 4/2016 | Russell |

OTHER PUBLICATIONS

Eth Zurich,3D video acquisition, representation & editing,Internet Citation,Jan. 1, 2007,pp. 1-199.
Kang, et al "Adaptive Geometry-Based Intra Prediction for Depth Video Coding," Proc. IEEE Int. Conf. Multimedia and Expo (ICME2010), Jul. 2010, pp. 1230-1235.
Kang, et al. Depth Video Coding Using Adaptive Geometry Based IintraP rediction for 3-D Video Systems, IEEE Transactions on Multimedia, vol. 14, No. 1, Feb. 2012.
European Search Report for EP16306269 dated Mar. 31, 2017.
International Search Report for PCT/EP17/074672 dated Jan. 5, 2018.

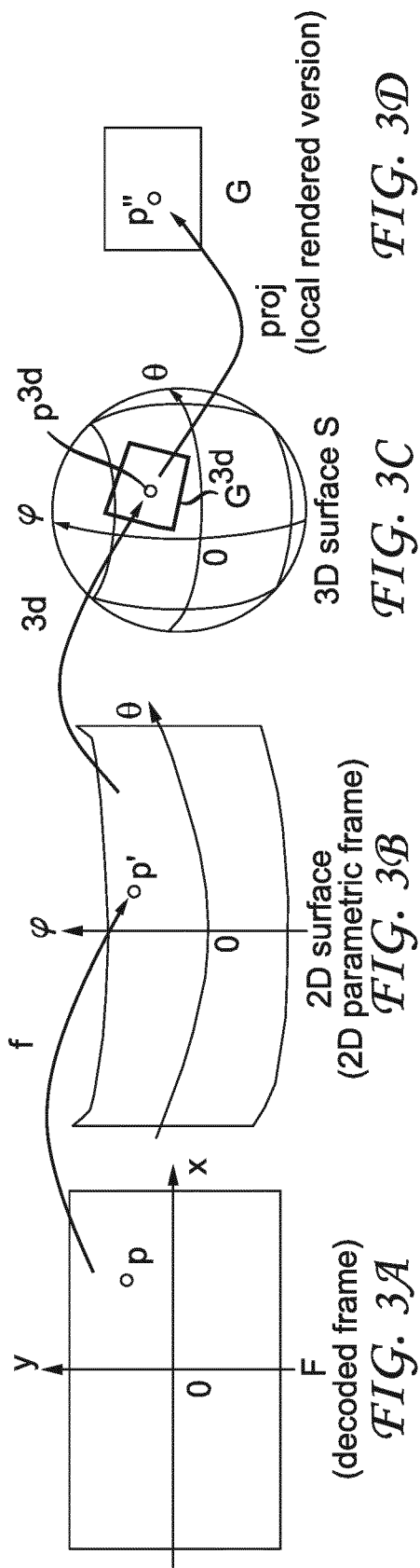
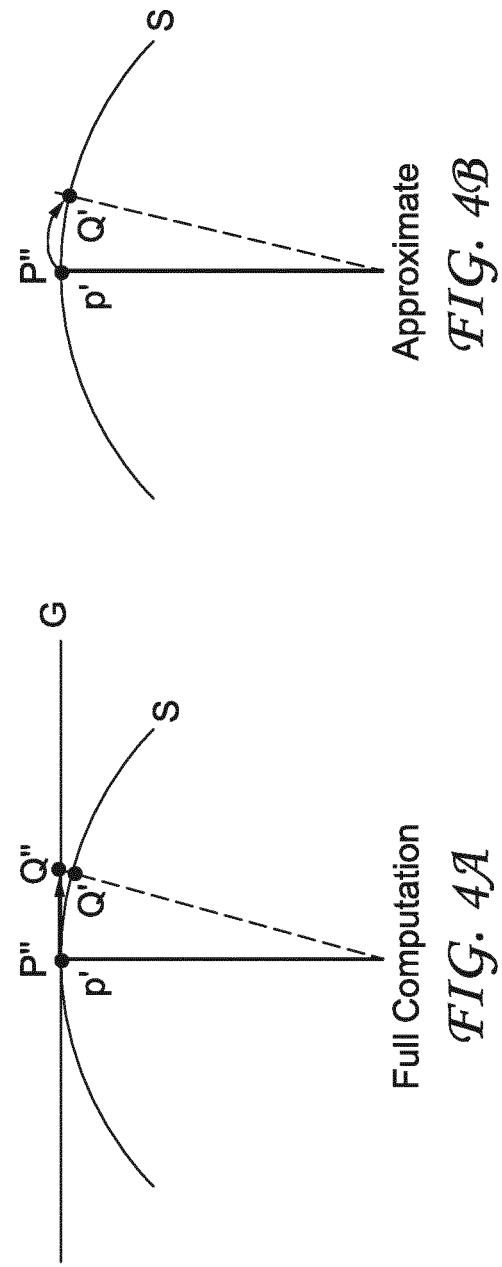

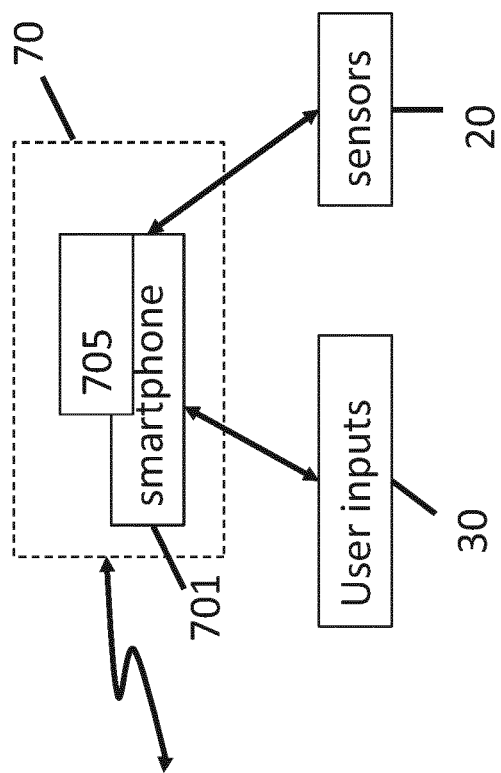
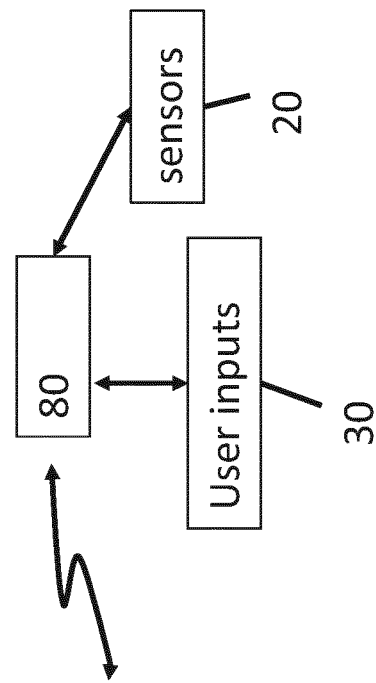

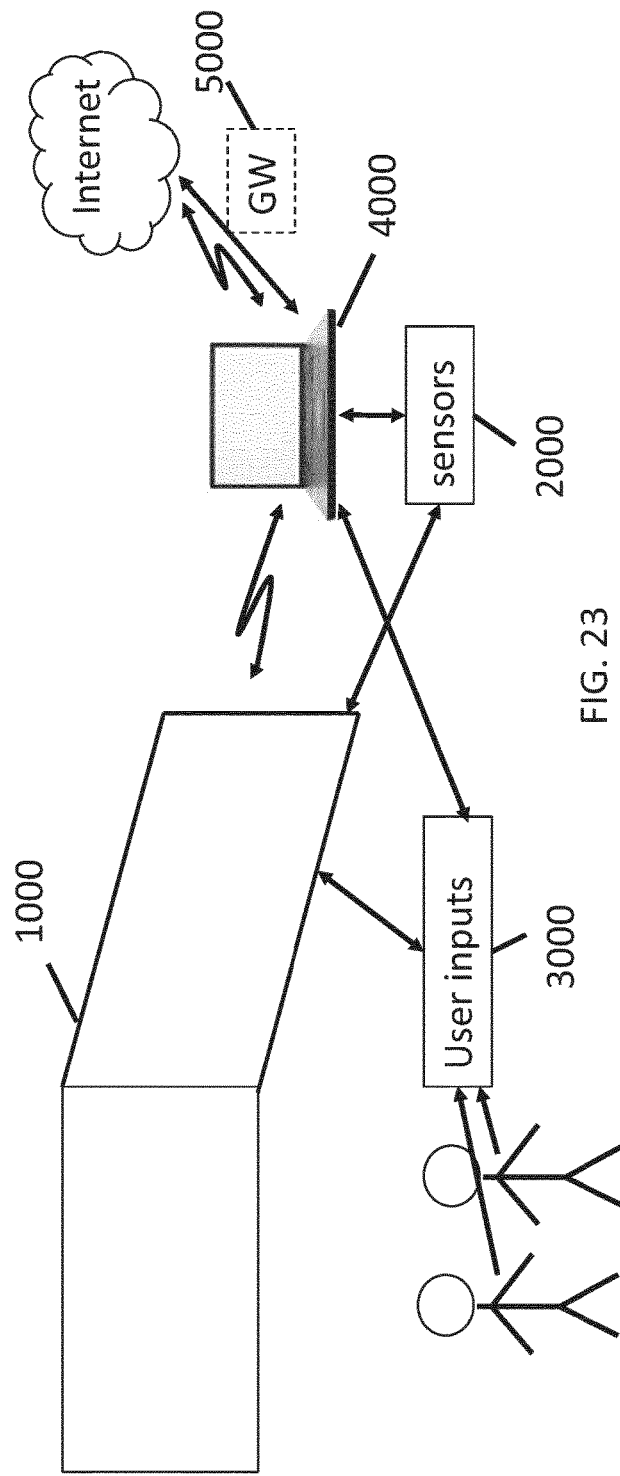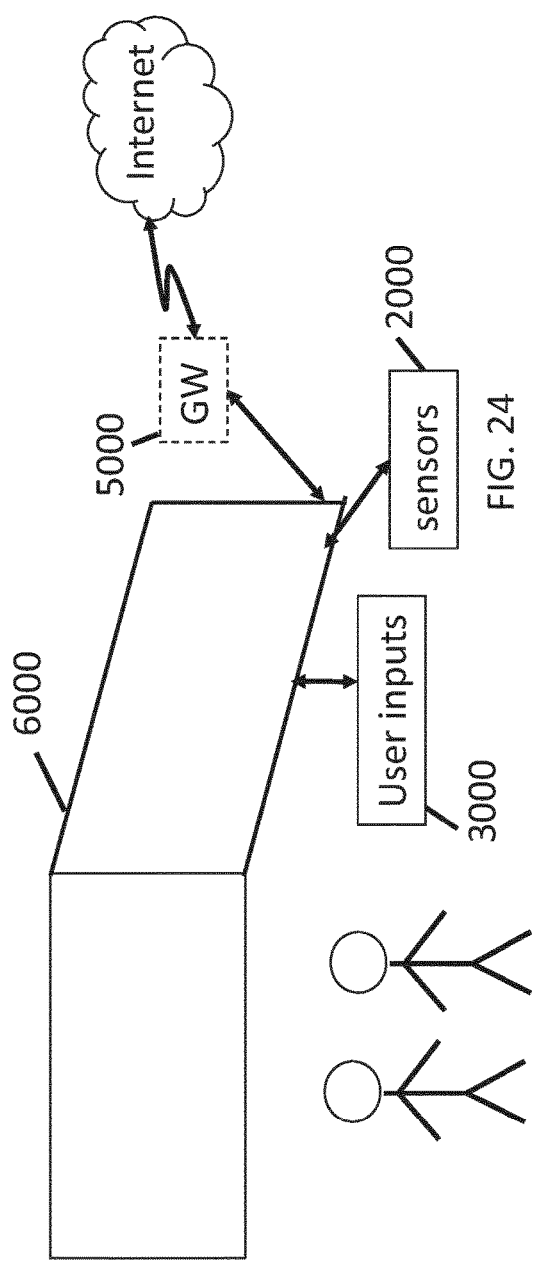
FIG. 23
FIG. 24

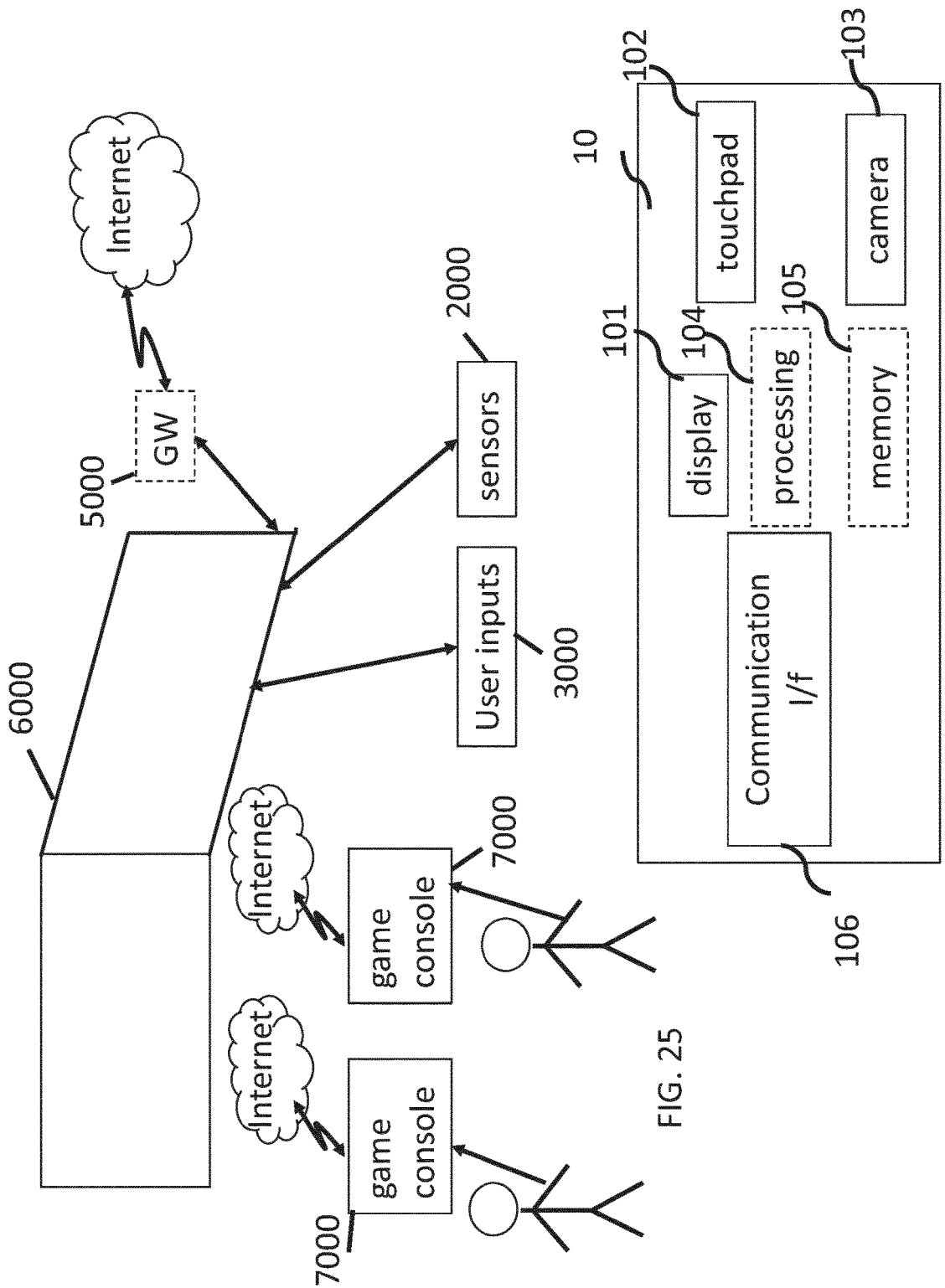

METHOD AND APPARATUS FOR OMNIDIRECTIONAL VIDEO CODING AND DECODING WITH ADAPTIVE INTRA PREDICTION

This application claims the benefit, under 35 U.S.C. § 365 of International Application PCT/EP2017/074672, filed Sep. 28, 2017, which was published in accordance with PCT Article 21(2) on Apr. 5, 2018 in English and which claims the benefit of European patent application 16306269.8, filed Sep. 30, 2016

TECHNICAL FIELD

The present embodiments generally relate to a method and an apparatus for video encoding and decoding, and more particularly, to a method and an apparatus for video encoding and decoding with adapted intra prediction.

BACKGROUND

Recently there has been a growth of available large field-of-view content (up to) 360°. Such content is potentially not fully visible by a user watching the content on immersive display devices such as Head Mounted Displays (HMD), smart glasses, PC screens, tablets, smartphones and the like. That means that at a given moment, a user may only be viewing a part of the content. However, a user can typically navigate within the content by various means such as head movement, mouse movement, touch screen, voice and the like. It is typically desirable to encode and decode this content.

SUMMARY

According to a general aspect of the present principles, a method for encoding video data is presented, comprising: accessing a directional mode for intra prediction for a first block of a picture; determining a plurality of reference samples in reconstructed blocks adjacent to the first block; propagating, along a non-straight curve, each of the plurality of reference samples to a set of sample locations within the first block, to form a predicted block for the first block, wherein the non-straight curve is based on the accessed directional mode; encoding the directional mode; and encoding a difference between the first block and the predicted block.

According to another aspect of the present principles, an apparatus for encoding video data is provided, comprising at least one memory and one or more processors configured to: access a directional mode for intra prediction for a first block of a picture; determine a plurality of reference samples in reconstructed blocks adjacent to the first block; propagate along a non-straight curve, each of the plurality of reference samples to a set of sample locations within the first block, to form a predicted block for the first block, wherein the non-straight curve is based on the accessed directional mode; encode the directional mode; and encode a difference between the first block and the predicted block.

The picture may be represented in a first format, and an acquired picture associated with the picture may be represented in a second format. The non-straight curve can be further based on a mapping between the first format and the second format. The first format may be a 2D rectangular format, the second format may be a 3D sphere format or a cube format, and the mapping may be an equi-rectangular mapping, a cube mapping, a pyramidal mapping, an icosahedral mapping or an octahedral mapping. The acquired picture may be used to generate the picture through the mapping. The mapping between the first format and the second format may be signaled in a bitstream.

According to another general aspect of the present principles, a method for decoding video data is presented, comprising: accessing a directional model for intra prediction for a first block of a picture; determining a plurality of references samples in decoded blocks adjacent to the first block; propagating, along a non-straight curve, each of the plurality of reference samples to a set of sample locations within the first block, to form a predicted block for the first block, wherein the non-straight curve is based on the accessed directional mode; and decoding the first block using the predicted block.

According to another aspect of the present principles, an apparatus is provided for decoding video data, comprising at least one memory and one or more processors configured to access a directional model for intra prediction for a first block of a picture; determine a plurality of references samples in decoded blocks adjacent to the first block; propagate along a non-straight curve, each of the plurality of reference samples to a set of sample locations within the first block, to form a predicted block for the first block, wherein the non-straight curve is based on the accessed directional mode; and decode the first block using the predicted block.

The decoded picture may be represented in a first format, and a display picture associated with the decoded picture may be represented in a second format. The non-straight curve can be further based on a mapping between the first format and the second format. The first format may be the 2D rectangular format, the second format may be a 3D sphere format or a cube format, and the mapping may be an equi-rectangular mapping, a cube mapping, a pyramidal mapping, an icosahedral mapping or an octahedral mapping. The decoded picture may be used to generate the display picture through an inverse mapping.

To determine reference samples for prediction, a first sample location in the first block may be mapped to a second sample location in a second block in a rendering space, the second block in the rendering space corresponding to the first block in the picture, a third location adjacent to the second block may be determined in the rendering space, based on the second sample location and the directional mode; then the third location may be mapped to a fourth location adjacent to the first block in the picture, wherein a sample at the fourth location is used as a reference sample to predict the first sample location in the block. A direction corresponding to the directional mode may be converted to another direction in the rendering space, and the third location adjacent to the second block may be determined based on the another direction.

To speed up the computation, a look-up table may associate a sample location in the first block to be predicted with a corresponding reference sample location. The look-up may depend on the directional mode and a location and size of the first block in the picture. A look-up table for a second block may be a sub-portion, for example, a top-left portion, of the look-up table for the first block when the second block is smaller than the first block.

In another embodiment, a function may associate a sample location in the first block to be predicted with a corresponding reference sample location, wherein one or more parameters of the function may depend on the directional mode and a location and size of the first block in the picture.

According to another aspect of the present principles, a bitstream is formatted to include: a directional mode for intra prediction encoded for a first block of a picture; and an encoding of a difference between the first block of the picture and a predicted block for the first block, wherein the predicted block is formed by propagating, along a non-straight curve, each of a plurality of reference samples to a set of sample locations within the first block, wherein the non-straight curve is based on the accessed directional mode, wherein the plurality of reference samples are in reconstructed blocks adjacent to the first block.

The present embodiments also provide an apparatus for encoding or decoding video data according to the methods described above. The present embodiments also provide an apparatus for transmitting the bitstream generated according to the methods described above.

The present embodiments also provide a computer readable storage medium having stored thereon instructions for encoding or decoding video data according to the methods described above. The present embodiments also provide a computer readable storage medium having stored thereon a bitstream generated according to the methods described above.

BRIEF DESCRIPTION OF THE DRAWINGS

FIGS. 3A, 3B, 3C and 3D illustrate an exemplary inverse equi-rectangular mapping.

FIG. 4A shows that a point is projected from the 3D surface to the rendered frame G, and FIG. 4B shows an approximated of the projection.

FIG. 21 represents a first embodiment of a system, according to a particular embodiment of the present principles.

FIG. 22 represents a first embodiment of a system, according to a particular embodiment of the present principles.

FIG. 23 represents a first embodiment of a system, according to a particular embodiment of the present principles.

FIG. 24 represents a first embodiment of a system according to the present principles.

FIG. 25 represents a first embodiment of a system according to the present principles.

FIG. 26 represents a first embodiment of an immersive video rendering device according to the present principles.

DETAILED DESCRIPTION

A large field-of-view content may be, among others, a three-dimension computer graphic imagery scene (3D CGI scene), a point cloud or an immersive video. Many terms might be used to design such immersive videos such as for example virtual Reality (VR), 360, panoramic, 4π steradians, immersive, omnidirectional, large field of view.

An immersive video typically refers to a video encoded on a rectangular frame that is a two-dimension array of pixels (i.e., element of color information) like a "regular" video. In many implementations, the following processes may be performed. To be rendered, the frame is, first, mapped on the inner face of a convex volume, also called mapping surface (e.g., a sphere, a cube, a pyramid), and, second, a part of this volume is captured by a virtual camera. Images captured by the virtual camera are rendered on the screen of the immersive display device. A stereoscopic video is encoded on one or two rectangular frames, projected on two mapping surfaces which are combined to be captured by two virtual cameras according to the characteristics of the device.

Pixels may be encoded according to a mapping function in the frame. The mapping function may depend on the mapping surface. For a same mapping surface, several mapping functions are possible. For example, the faces of a cube may be structured according to different layouts within the frame surface. A sphere may be mapped according to an equirectangular projection or to a gnomonic projection for example. The organization of pixels resulting from the selected projection function modifies or breaks lines continuities, orthonormal local frame, pixel densities and introduces periodicity in time and space. These are typical features that are used to encode and decode videos. Existing encoding and decoding methods usually do not take specificities of immersive videos into account. Indeed, as immersive videos can be 360° videos, a panning, for example, introduces motion and discontinuities that require a large amount of data to be encoded while the content of the scene does not change. Taking immersive videos specificities into account while encoding and decoding video frames would bring valuable advantages to the encoding or decoding methods.

Figure 1:
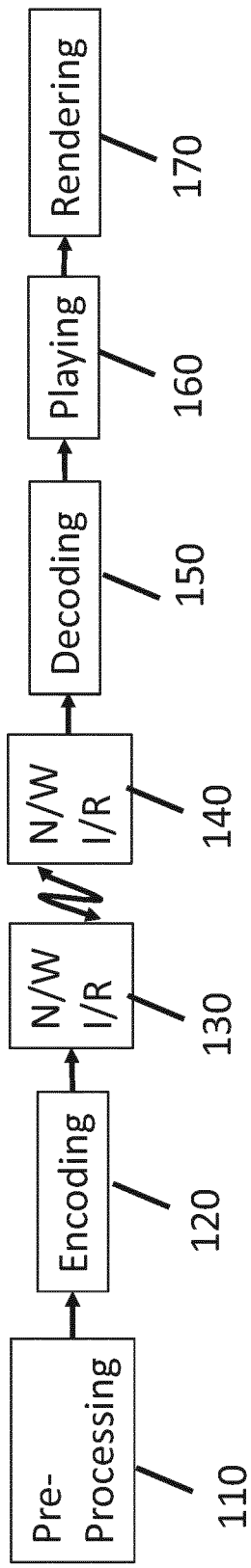
FIG. 1 illustrates an exemplary system for encoding and decoding omnidirectional videos, according to an embodiment of the present principles.

FIG. 1 illustrates a general overview of an encoding and decoding system according to an example embodiment. The system of FIG. 1 is a functional system. A pre-processing module 110 may prepare the content for encoding by the encoding device 120. The pre-processing module 110 may perform multi-image acquisition, merging of the acquired multiple images in a common space (typically a 3D sphere if we encode the directions), and mapping of the 3D sphere into a 2D frame using, for example, but not limited to, an equirectangular mapping or a cube mapping. The pre-processing module 110 may also accept an omnidirectional video in a particular format (for example, equirectangular) as input, and pre-processes the video to change the mapping into a format more suitable for encoding. Depending on the acquired video data representation, the pre-processing module 110 may perform a mapping space change.

The encoding device 120 and the encoding method will be described with respect to other figures of the specification. After being encoded, the data, which may encode immersive video data or 3D CGI encoded data for instance, are sent to a network interface 130, which can be typically implemented in any network interface, for instance present in a gateway. The data are then transmitted through a communication network, such as internet but any other network can be foreseen. Then the data are received via network interface 140. Network interface 140 can be implemented in a gateway, in a television, in a set-top box, in a head mounted display device, in an immersive (projective) wall or in any immersive video rendering device.

After reception, the data are sent to a decoding device 150. Decoding function is one of the processing functions described in the following FIGS. 18 to 28. Decoded data are then processed by a player 160. Player 160 prepares the data for the rendering device 170 and may receive external data from sensors or users input data. More precisely, the player 160 prepares the part of the video content that is going to be displayed by the rendering device 170. The decoding device 150 and the player 160 may be integrated in a single device (e.g., a smartphone, a game console, a STB, a tablet, a computer, etc.). In other embodiments, the player 160 may be integrated in the rendering device 170.

Several types of systems may be envisioned to perform the decoding, playing and rendering functions of an immersive display device, for example when rendering an immersive video.

A first system, for processing augmented reality, virtual reality, or augmented virtuality content is illustrated in FIGS. 18 to 22. Such a system comprises processing functions, an immersive video rendering device which may be a head mounted display (HMD), a tablet or a smartphone for example and may comprise sensors. The immersive video rendering device may also comprise additional interface modules between the display device and the processing functions. The processing functions can be performed by one or several devices. They can be integrated into the immersive video rendering device or they can be integrated into one or several processing devices. The processing device comprises one or several processors and a communication interface with the immersive video rendering device, such as a wireless or wired communication interface.

The processing device can also comprise a second communication interface with a wide access network such as internet and access content located on a cloud, directly or through a network device such as a home or a local gateway. The processing device can also access a local storage through a third interface such as a local access network interface of Ethernet type. In an embodiment, the processing device may be a computer system having one or several processing units. In another embodiment, it may be a smartphone which can be connected through wired or wireless links to the immersive video rendering device or which can be inserted in a housing in the immersive video rendering device and communicating with it through a connector or wirelessly as well. Communication interfaces of the processing device are wireline interfaces (for example a bus interface, a wide area network interface, a local area network interface) or wireless interfaces (such as a IEEE 802.11 interface or a Bluetooth® interface).

When the processing functions are performed by the immersive video rendering device, the immersive video rendering device can be provided with an interface to a network directly or through a gateway to receive and/or transmit content.

In another embodiment, the system comprises an auxiliary device which communicates with the immersive video rendering device and with the processing device. In such an embodiment, this auxiliary device can contain at least one of the processing functions.

The immersive video rendering device may comprise one or several displays. The device may employ optics such as lenses in front of each of its display. The display can also be a part of the immersive display device like in the case of smartphones or tablets. In another embodiment, displays and optics may be embedded in a helmet, in glasses, or in a visor that a user can wear. The immersive video rendering device may also integrate several sensors, as described later on. The immersive video rendering device can also comprise several interfaces or connectors. It might comprise one or several wireless modules in order to communicate with sensors, processing functions, handheld or other body parts related devices or sensors.

The immersive video rendering device can also comprise processing functions executed by one or several processors and configured to decode content or to process content. By processing content here, it is understood all functions to prepare a content that can be displayed. This may comprise, for instance, decoding a content, merging content before displaying it and modifying the content to fit with the display device.

One function of an immersive content rendering device is to control a virtual camera which captures at least a part of the content structured as a virtual volume. The system may comprise pose tracking sensors which totally or partially track the user's pose, for example, the pose of the user's head, in order to process the pose of the virtual camera. Some positioning sensors may track the displacement of the user. The system may also comprise other sensors related to environment for example to measure lighting, temperature or sound conditions. Such sensors may also be related to the users' bodies, for instance, to measure sweating or heart rate.

Information acquired through these sensors may be used to process the content. The system may also comprise user input devices (e.g., a mouse, a keyboard, a remote control, a joystick). Information from user input devices may be used to process the content, manage user interfaces or to control the pose of the virtual camera. Sensors and user input devices communicate with the processing device and/or with the immersive rendering device through wired or wireless communication interfaces.

Using FIGS. 18 to 22, several embodiments are described of this first type of system for displaying augmented reality, virtual reality, augmented virtuality or any content from augmented reality to virtual reality.

Figure 18:
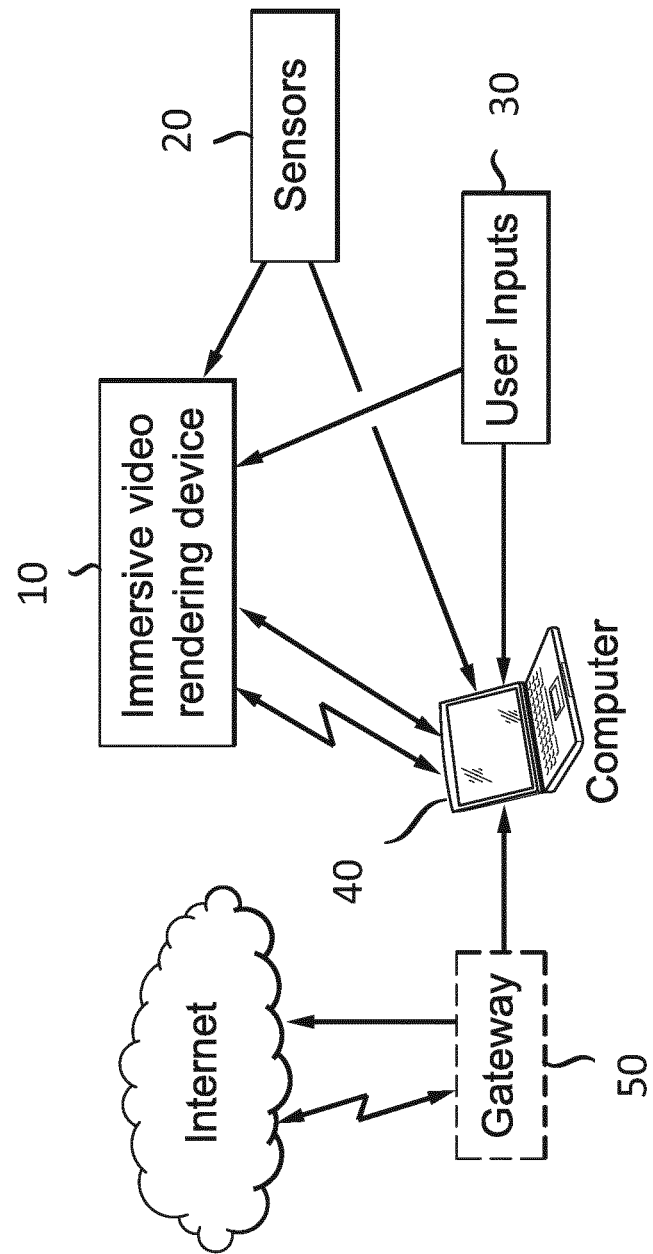
FIG. 18 represents a first embodiment of a system, according to a particular embodiment of the present principles.

FIG. 18 illustrates a particular embodiment of a system configured to decode, process and render immersive videos. The system comprises an immersive video rendering device 10, sensors 20, user inputs devices 30, a computer 40 and a gateway 50 (optional).

The immersive video rendering device 10, illustrated in FIG. 26, comprises a display 101. The display is, for example of OLED or LCD type. The immersive video rendering device 10 is, for instance a HMD, a tablet or a smartphone. The device 10 may comprise a touch surface 102 (e.g., a touchpad or a tactile screen), a camera 103, a memory 105 in connection with at least one processor 104 and at least one communication interface 106. The at least one processor 104 processes the signals received from the sensors 20.

Some of the measurements from sensors are used to compute the pose of the device and to control the virtual camera. Sensors used for pose estimation are, for instance, gyroscopes, accelerometers or compasses. More complex systems, for example using a rig of cameras may also be used. In this case, the at least one processor performs image processing to estimate the pose of the device 10. Some other measurements are used to process the content according to environment conditions or user's reactions. Sensors used for observing environment and users are, for instance, microphones, light sensor or contact sensors. More complex systems may also be used like, for example, a video camera tracking user's eyes. In this case the at least one processor performs image processing to operate the expected measurement. Data from sensors 20 and user input devices 30 can also be transmitted to the computer 40 which will process the data according to the input of these sensors.

Memory 105 includes parameters and code program instructions for the processor 104. Memory 105 can also comprise parameters received from the sensors 20 and user input devices 30. Communication interface 106 enables the immersive video rendering device to communicate with the computer 40. The communication interface 106 of the processing device may be wireline interfaces (for example a bus interface, a wide area network interface, a local area network interface) or wireless interfaces (such as a IEEE 802.11 interface or a Bluetooth® interface).

Computer 40 sends data and optionally control commands to the immersive video rendering device 10. The computer 40 is in charge of processing the data, i.e., prepare them for display by the immersive video rendering device 10. Processing can be done exclusively by the computer 40 or part of the processing can be done by the computer and part by the immersive video rendering device 10. The computer 40 is connected to internet, either directly or through a gateway or network interface 50. The computer 40 receives data representative of an immersive video from the internet, processes these data (e.g., decodes them and possibly prepares the part of the video content that is going to be displayed by the immersive video rendering device 10) and sends the processed data to the immersive video rendering device 10 for display. In another embodiment, the system may also comprise local storage (not represented) where the data representative of an immersive video are stored, said local storage can be on the computer 40 or on a local server accessible through a local area network for instance (not represented).

Figure 19:
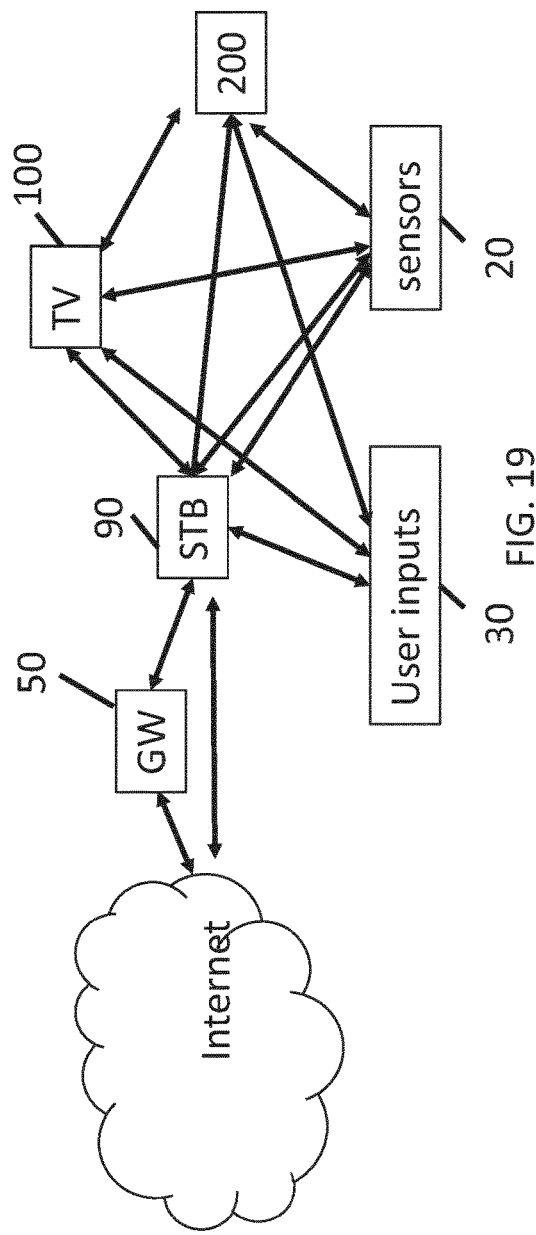
FIG. 19 represents a first embodiment of a system, according to a particular embodiment of the present principles.

FIG. 19 represents a second embodiment. In this embodiment, a STB 90 is connected to a network such as internet directly (i.e., the STB 90 comprises a network interface) or via a gateway 50. The STB 90 is connected through a wireless interface or through a wired interface to rendering devices such as a television set 100 or an immersive video rendering device 200. In addition to classic functions of a STB, STB 90 comprises processing functions to process video content for rendering on the television 100 or on any immersive video rendering device 200. These processing functions are the same as the ones that are described for computer 40 and are not described again here. Sensors 20 and user input devices 30 are also of the same type as the ones described earlier with regards to FIG. 18. The STB 90 obtains the data representative of the immersive video from the internet. In another embodiment, the STB 90 obtains the data representative of the immersive video from a local storage (not represented) where the data representative of the immersive video are stored.

Figure 20:
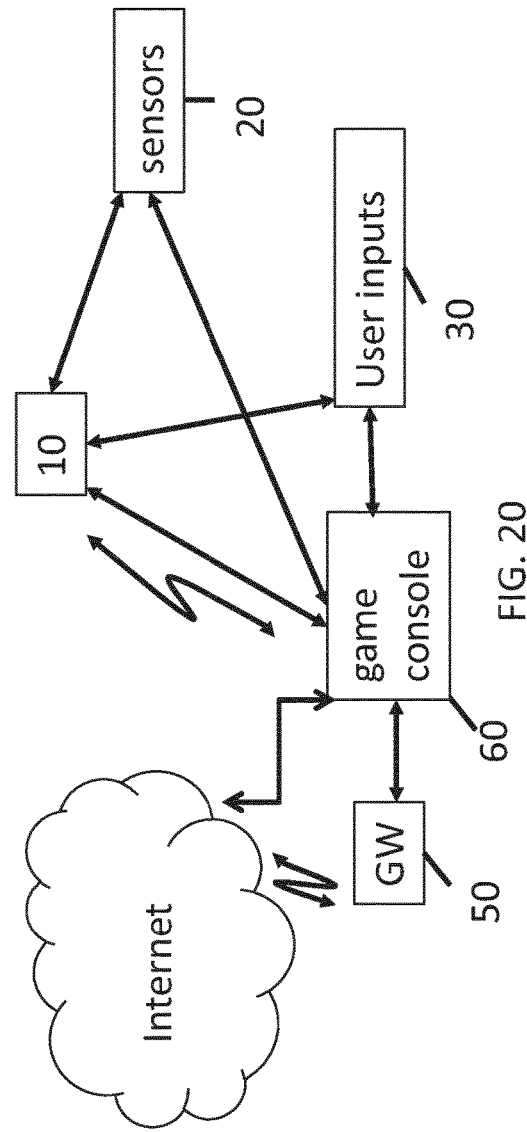
FIG. 20 represents a first embodiment of a system, according to a particular embodiment of the present principles.

FIG. 20 represents a third embodiment related to the one represented in FIG. 18. The game console 60 processes the content data. Game console 60 sends data and optionally control commands to the immersive video rendering device 10. The game console 60 is configured to process data representative of an immersive video and to send the processed data to the immersive video rendering device 10 for display. Processing can be done exclusively by the game console 60 or part of the processing can be done by the immersive video rendering device 10.

The game console 60 is connected to internet, either directly or through a gateway or network interface 50. The game console 60 obtains the data representative of the immersive video from the internet. In another embodiment, the game console 60 obtains the data representative of the immersive video from a local storage (not represented) where the data representative of the immersive video are stored, said local storage can be on the game console 60 or on a local server accessible through a local area network for instance (not represented).

The game console 60 receives data representative of an immersive video from the internet, processes these data (e.g., decodes them and possibly prepares the part of the video that is going to be displayed) and sends the processed data to the immersive video rendering device 10 for display. The game console 60 may receive data from sensors 20 and user input devices 30 and may use them to process the data representative of an immersive video obtained from the internet or from the from the local storage.

FIG. 21 represents a fourth embodiment of said first type of system where the immersive video rendering device 70 is formed by a smartphone 701 inserted in a housing 705. The smartphone 701 may be connected to internet and thus may obtain data representative of an immersive video from the internet. In another embodiment, the smartphone 701 obtains data representative of an immersive video from a local storage (not represented) where the data representative of an immersive video are stored, said local storage can be on the smartphone 701 or on a local server accessible through a local area network for instance (not represented).

Figure 27:
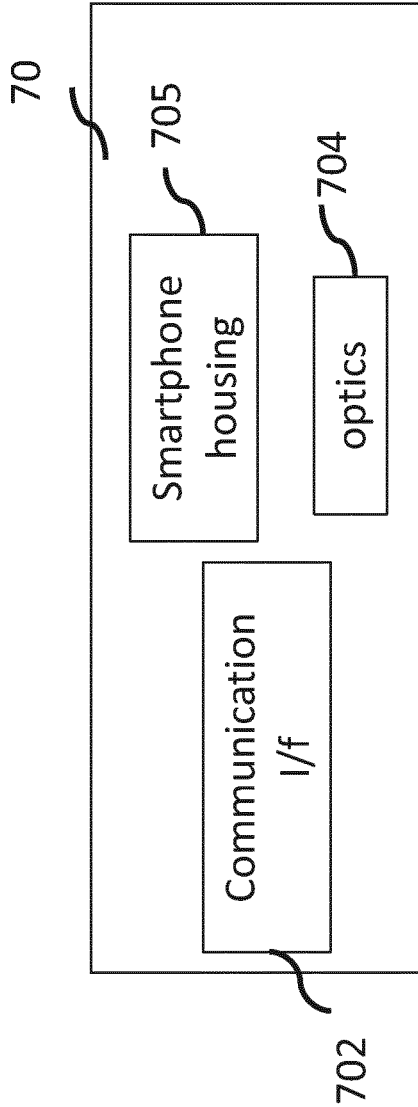
FIG. 27 represents a first embodiment of an immersive video rendering device according to the present principles.

Immersive video rendering device 70 is described with reference to FIG. 27 which gives a preferred embodiment of immersive video rendering device 70. It optionally comprises at least one network interface 702 and the housing 705 for the smartphone 701. The smartphone 701 comprises all functions of a smartphone and a display. The display of the smartphone is used as the immersive video rendering device 70 display. Therefore no display other than the one of the smartphone 701 is included. However, optics 704, such as lenses, are included for seeing the data on the smartphone display. The smartphone 701 is configured to process (e.g., decode and prepare for display) data representative of an immersive video possibly according to data received from the sensors 20 and from user input devices 30. Some of the measurements from sensors are used to compute the pose of the device and to control the virtual camera. Sensors used for pose estimation are, for instance, gyroscopes, accelerometers or compasses. More complex systems, for example using a rig of cameras may also be used. In this case, the at least one processor performs image processing to estimate the pose of the device 10. Some other measurements are used to process the content according to environment conditions or user's reactions. Sensors used for observing environment and users are, for instance, microphones, light sensor or contact sensors. More complex systems may also be used like, for example, a video camera tracking user's eyes. In this case the at least one processor performs image processing to operate the expected measurement.

FIG. 22 represents a fifth embodiment of said first type of system in which the immersive video rendering device 80 comprises all functionalities for processing and displaying the data content. The system comprises an immersive video rendering device 80, sensors 20 and user input devices 30. The immersive video rendering device 80 is configured to process (e.g., decode and prepare for display) data representative of an immersive video possibly according to data received from the sensors 20 and from the user input devices 30. The immersive video rendering device 80 may be connected to internet and thus may obtain data representative of an immersive video from the internet. In another embodiment, the immersive video rendering device 80 obtains data representative of an immersive video from a local storage (not represented) where the data representative of an immersive video are stored, said local storage can be on the rendering device 80 or on a local server accessible through a local area network for instance (not represented).

Figure 28:
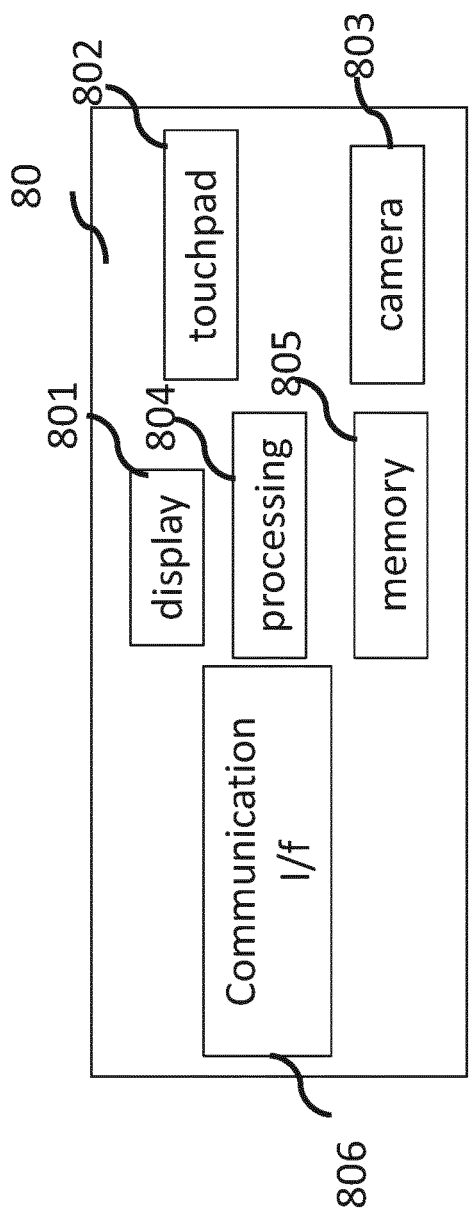
FIG. 28 represents a first embodiment of an immersive video rendering device according to the present principles.

The immersive video rendering device 80 is illustrated in FIG. 28. The immersive video rendering device comprises a display 801. The display can be for example of OLED or LCD type, a touchpad (optional) 802, a camera (optional) 803, a memory 805 in connection with at least one processor 804 and at least one communication interface 806. Memory 805 comprises parameters and code program instructions for the processor 804. Memory 805 can also comprise parameters received from the sensors 20 and user input devices 30. Memory can also be large enough to store the data representative of the immersive video content. For this several types of memories can exist and memory 805 can be a single memory or can be several types of storage (SD card, hard disk, volatile or non-volatile memory . . . ) Communication interface 806 enables the immersive video rendering device to communicate with internet network. The processor 804 processes data representative of the video in order to display them of display 801. The camera 803 captures images of the environment for an image processing step. Data are extracted from this step in order to control the immersive video rendering device.

A second system, for processing augmented reality, virtual reality, or augmented virtuality content is illustrated in FIGS. 23 to 25. Such a system comprises an immersive wall.

FIG. 23 represents a system of the second type. It comprises a display 1000 which is an immersive (projective) wall which receives data from a computer 4000. The computer 4000 may receive immersive video data from the internet. The computer 4000 is usually connected to internet, either directly or through a gateway 5000 or network interface. In another embodiment, the immersive video data are obtained by the computer 4000 from a local storage (not represented) where the data representative of an immersive video are stored, said local storage can be in the computer 4000 or in a local server accessible through a local area network for instance (not represented).

This system may also comprise sensors 2000 and user input devices 3000. The immersive wall 1000 can be of OLED or LCD type. It can be equipped with one or several cameras. The immersive wall 1000 may process data received from the sensor 2000 (or the plurality of sensors 2000). The data received from the sensors 2000 may be related to lighting conditions, temperature, environment of the user, e.g., position of objects.

The immersive wall 1000 may also process data received from the user inputs devices 3000. The user input devices 3000 send data such as haptic signals in order to give feedback on the user emotions. Examples of user input devices 3000 are handheld devices such as smartphones, remote controls, and devices with gyroscope functions.

Sensors 2000 and user input devices 3000 data may also be transmitted to the computer 4000. The computer 4000 may process the video data (e.g., decoding them and preparing them for display) according to the data received from these sensors/user input devices. The sensors signals can be received through a communication interface of the immersive wall. This communication interface can be of Bluetooth type, of WIFI type or any other type of connection, preferentially wireless but can also be a wired connection.

Computer 4000 sends the processed data and optionally control commands to the immersive wall 1000. The computer 4000 is configured to process the data, i.e., preparing them for display, to be displayed by the immersive wall 1000. Processing can be done exclusively by the computer 4000 or part of the processing can be done by the computer 4000 and part by the immersive wall 1000.

FIG. 24 represents another system of the second type. It comprises an immersive (projective) wall 6000 which is configured to process (e.g., decode and prepare data for display) and display the video content. It further comprises sensors 2000, user input devices 3000.

The immersive wall 6000 receives immersive video data from the internet through a gateway 5000 or directly from internet. In another embodiment, the immersive video data are obtained by the immersive wall 6000 from a local storage (not represented) where the data representative of an immersive video are stored, said local storage can be in the immersive wall 6000 or in a local server accessible through a local area network for instance (not represented).

This system may also comprise sensors 2000 and user input devices 3000. The immersive wall 6000 can be of OLED or LCD type. It can be equipped with one or several cameras. The immersive wall 6000 may process data received from the sensor 2000 (or the plurality of sensors 2000). The data received from the sensors 2000 may be related to lighting conditions, temperature, environment of the user, e.g., position of objects.

The immersive wall 6000 may also process data received from the user inputs devices 3000. The user input devices 3000 send data such as haptic signals in order to give feedback on the user emotions. Examples of user input devices 3000 are handheld devices such as smartphones, remote controls, and devices with gyroscope functions.

The immersive wall 6000 may process the video data (e.g., decoding them and preparing them for display) according to the data received from these sensors/user input devices. The sensors signals can be received through a communication interface of the immersive wall. This communication interface can be of Bluetooth type, of WIFI type or any other type of connection, preferentially wireless but can also be a wired connection. The immersive wall 6000 may comprise at least one communication interface to communicate with the sensors and with internet.

FIG. 25 illustrates a third embodiment where the immersive wall is used for gaming. One or several gaming consoles 7000 are connected, preferably through a wireless interface to the immersive wall 6000. The immersive wall 6000 receives immersive video data from the internet through a gateway 5000 or directly from internet. In another embodiment, the immersive video data are obtained by the immersive wall 6000 from a local storage (not represented) where the data representative of an immersive video are stored, said local storage can be in the immersive wall 6000 or in a local server accessible through a local area network for instance (not represented).

Gaming console 7000 sends instructions and user input parameters to the immersive wall 6000. Immersive wall 6000 processes the immersive video content possibly according to input data received from sensors 2000 and user input devices 3000 and gaming consoles 7000 in order to prepare the content for display. The immersive wall 6000 may also comprise internal memory to store the content to be displayed.

Figure 2A:
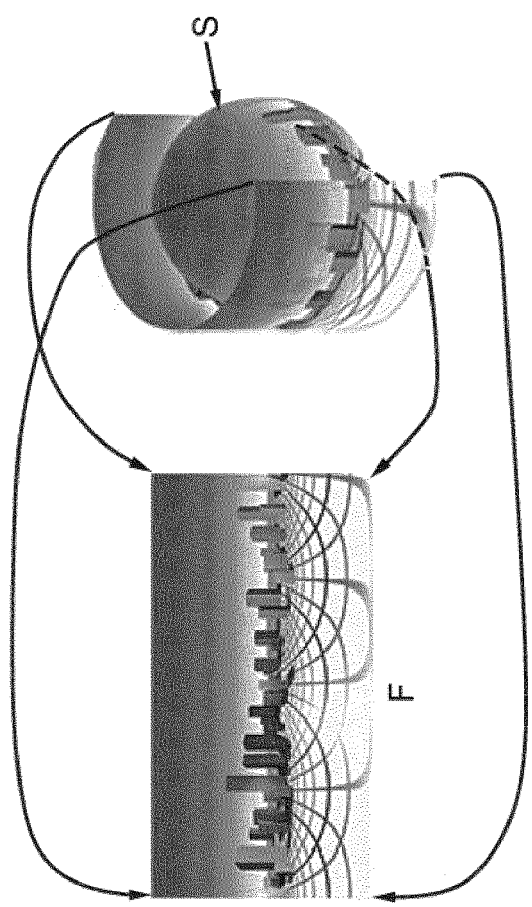
FIG. 2A shows that an exemplary sphere surface S is mapped to a 2D frame F using an equi-rectangular projection.
Figure 2C:
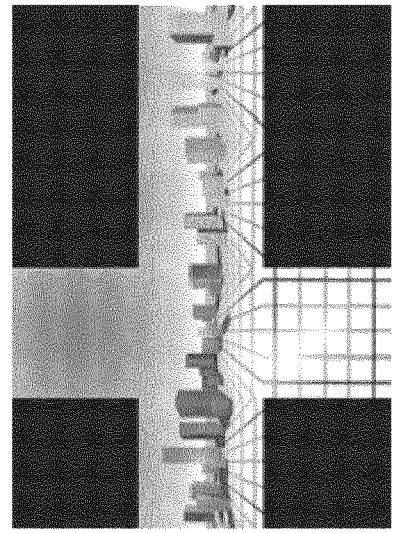
FIG. 2B shows that an exemplary cube surface is mapped to a 2D frame as shown in FIG. 2C using a cube mapping.
Figure 2B:
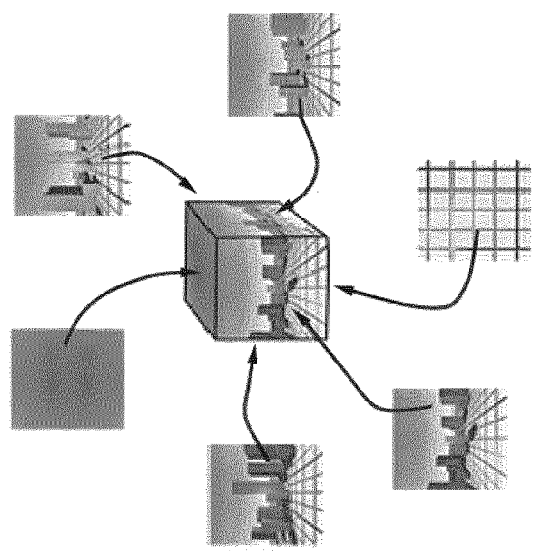

In one embodiment, we consider that the omnidirectional video is represented in a format that enables the projection of the surrounding 3D surface S onto a standard rectangular frame F that is represented in a format suitable for a video codec. Various projections can be used to project 3D surfaces to 2D surfaces. For example, FIG. 2A shows that an exemplary sphere surface S is mapped to a 2D frame F using an equi-rectangular projection, and FIG. 2B shows that an exemplary cube surface is mapped to a 2D frame as shown in FIG. 2C using a cube mapping. Other mappings, such as pyramidal, icosahedral or octahedral mapping, can map a 3D surface into a 2D frame.

The 2D frame F can then be encoded using existing video encoders, for example, encoders compliant with VP9, VP10, MPEG-2, H.264/AVC, or H.265/HEVC. The 2D frame F can also be encoded with an encoder adaptive to the properties of omnidirectional videos, for example, using an adjusted VP9, VP10, MPEG-2, H.264/AVC, or H.265/HEVC encoder. After encoding and decoding, the decoded 2D frame can be mapped back to the corresponding 3D surface, for example, a sphere for an equi-rectangular mapping or a cube for cube mapping. The 3D surface can then be projected onto a "virtual screen" corresponding to a user's viewpoint in order to obtain the final rendered frame. The steps of decoding the 2D frame and projecting from the 3D surface to a rendered frame can be merged into a single step, where a part of the decoded frame is mapped onto the rendered frame.

For simplicity of notation, we may refer to the decoded 2D frame also as "F," and the 3D surface used in rendering also as S. It should be understood that the 2D frame to be encoded and the 2D frame to be decoded may be different due to video compression, and the 3D surface in pre-processing and the 3D surface in rendering may also be different. In the present application, we use the terms "mapping" and "projection" interchangeably, use the terms "pixel" and "sample" interchangeably, and use the terms "frame" and "picture" interchangeably.

Equi-Rectangular Mapping

FIG. 3 illustrates an exemplary inverse equi-rectangular mapping, where a 2D frame is mapped to a rendered frame. FIG. 3A shows a point P in a x-y coordinate in the decoded frame (also referred to as an "equi-rectangular frame"). FIG. 3B shows a point P' mapped from P onto the 2D surface of rendering, using θ–φ polar coordinates. FIG. 3C shows point $P^{3d}$ corresponding to P' in the 3D rendering space S, using Cartesian coordinates. FIG. 3D shows point P''', resulting from $P^{3d}$ projected onto the local plane tangent to the surface at $P^{3d}$ in a local rendered frame G. By construction P''' is at the center of the frame. The local rendered frame G corresponds to a portion of the 2D frame F, often based on what the user wants to see, for example, based on what the HMD or the user's handheld device points at. The local rendered frame G is also referred to as a local rendered version.

The mappings from P to P', from P' to $P^{3d}$, and from $P^{3d}$ to P''' are denoted as "f," "3d," and "proj," respectively. In FIG. 3, the inverse equi-rectangular mapping is shown in multiple steps ("f," "3d," and "proj") for illustration purposes. The inverse equi-rectangular mapping can be performed in fewer steps, for example, by combining "f," "3d," and "prof" into one or two steps.

Mathematically, the mappings "f" can be represented as:

$$f: M(x,y) \to M'(\theta, \varphi), \theta = 2\pi x, \varphi = \pi y \quad (1)$$

when a pixel M(x,y) in the frame F is mapped onto the 2D parametric surface at point M'(θ, φ), assuming normalized coordinates. With non-normalized coordinates:

$$\theta = \frac{2\pi\left(x - \frac{w}{2}\right)}{w}, \varphi = \frac{\pi\left(\frac{h}{2} - y\right)}{h}. \quad (2)$$

The mapping "3d" from a point M'(θ, φ) onto the 3D surface of coordinate $M^{3d}$ can be represented as:

$$3d: M' \to M^{3d}, M^{3d} = \begin{bmatrix} \sin\left(\varphi - \frac{\pi}{2}\right)\cos(\theta) \\ \sin\left(\varphi - \frac{\pi}{2}\right)\sin(\theta) \\ \cos\left(\varphi - \frac{\pi}{2}\right) \end{bmatrix}. \quad (3)$$

In order to go back to the frame F from a point $M^{3d}$, we compute the inverse transform $T^{-1}$:

$$T^{-1}: M^{3d} \to M, M = f^{-1}(3d^{-1}(M^{3d})) \quad (4)$$

From a point $M^{3d}(X,Y,Z)$ on 3D surface S, we can go back to the 2D parametric frame using the standard Cartesian to polar transformation:

$$3d^{-1}: M^{3d} \to M', \theta = \mathrm{atan}\left(\frac{Y}{X}\right) + \pi, \quad (5)$$

-continued $$\varphi = -\operatorname{atan}\left(\frac{\sqrt{X^2+Y^2}}{Z}\right)+\frac{\pi}{2}$$

To further go back to the 2D frame F, we can use:

$$f^{-1}:M'(\theta,\varphi)\rightarrow M(x,y) \quad (6)$$

For singular points (typically, at the poles), when x and y are close to 0, we may directly set:

$$\theta=0,\varphi=\operatorname{sign}(Z)\frac{\pi}{2}. \quad (7)$$

It should be noted that special care should be taken for modular cases.

FIG. 4A shows that a point is projected ("proj") from the 3D surface to the rendered frame G. If a point Q' viewed from the local rendered frame in G is close to P', the plane tangent to the surface S can be approximated by the surface itself. In FIG. 4B, we show that Q'' can be approximated by image of Q on the surface Q'.

The projection from a 3D space to a 2D surface often introduces some effects or alterations that may be challenging for encoding the resulting video at a quality/bitrate trade-off similar to those obtained for conventional planar ones. Those effects or alterations might include:
  Strong geometry distortions:
    straight lines are not straight anymore,
    orthonormal coordinate system are not orthonormal anymore
  Non-uniform pixel density: a pixel in the frame to be encoded does not always represent the same size on the surface to be encoded (i.e. the same size on the image during the rendering phase)
  Strong discontinuities: the frame layout may introduce strong discontinuities between two adjacent pixels
  Some periodicity may occur in the frame (for example from one border to the opposite one)
TABLE 1 lists some alterations for different mappings:

TABLE 1

| | Mapping type | | |
|---|---|---|---|
| | Equi-rectangular | Cube mapping | Pyramidal |
| 3D surface | Sphere | Cube | Pyramid |
| Straight lines | Continuously distorted | Piece-wise straight | Piece-wise straight |
| Orthonormal local frame | No | Yes, except on face boundaries | No, except on square face |
| Pixel density | Non-uniform (higher on equator line) | Almost constant | Non-uniform, except on square face |
| Discontinuities | No | Yes, on face boundaries | Yes, on face boundaries |
| Continuities | Yes, horizontal | Yes, between some faces | Yes, between some faces |

In the following, we mainly use an HEVC encoder and decoder to illustrate the encoding and decoding of omnidirectional videos. It should be noted that the present principles can be applied to other encoders or decoders.

Figure 5:
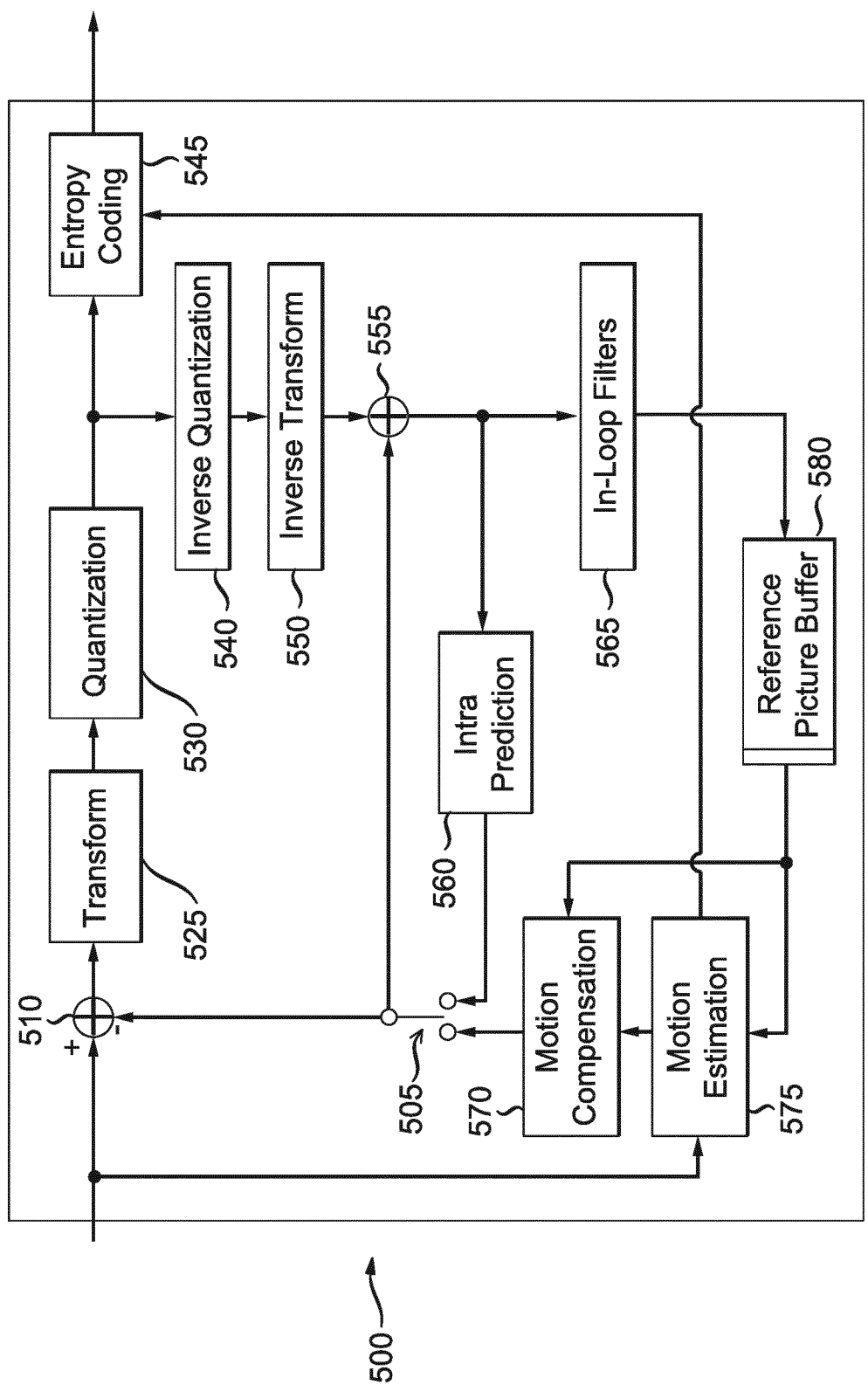
FIG. 5 illustrates a block diagram of an exemplary HEVC video encoder.

FIG. 5 illustrates an exemplary HEVC encoder 500. To encode a video sequence with one or more pictures, a picture is partitioned into one or more slices where each slice can include one or more slice segments. A slice segment is organized into coding units, prediction units and transform units.

In the present application, the terms "reconstructed" and "decoded" may be used interchangeably. Usually but not necessarily the term "reconstructed" is used at the encoder side while "decoded" is used at the decoder side.

The HEVC specification distinguishes between "blocks" and "units," where a "block" addresses a specific area in a sample array (e.g., luma, Y), and the "unit" includes the collocated block of all encoded color components (Y, Cb, Cr, or monochrome), syntax elements and prediction data that are associated with the block (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block is partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU. In the present application, the term "block" can be used to refer to any of CTU, CU, PU, TU, CB, PB and TB. In addition, the "block" can also be used to refer to a macroblock, a partition and a sub-block as specified in H.264/AVC or other video coding standards, and more generally to refer to an array of data of various sizes.

In the exemplary encoder 500, a picture is encoded by the encoder elements as described below. The picture to be encoded is processed in units of CUs. Each CU is encoded using either an intra or inter mode. When a CU is encoded in an intra mode, it performs intra prediction (560). In an inter mode, motion estimation (575) and compensation (570) are performed. The encoder decides (505) which one of the intra mode or inter mode to use for encoding the CU, and indicates the intra/inter decision by a prediction mode flag. Prediction residuals are calculated by subtracting (510) the predicted block from the original image block.

Figure 6A:
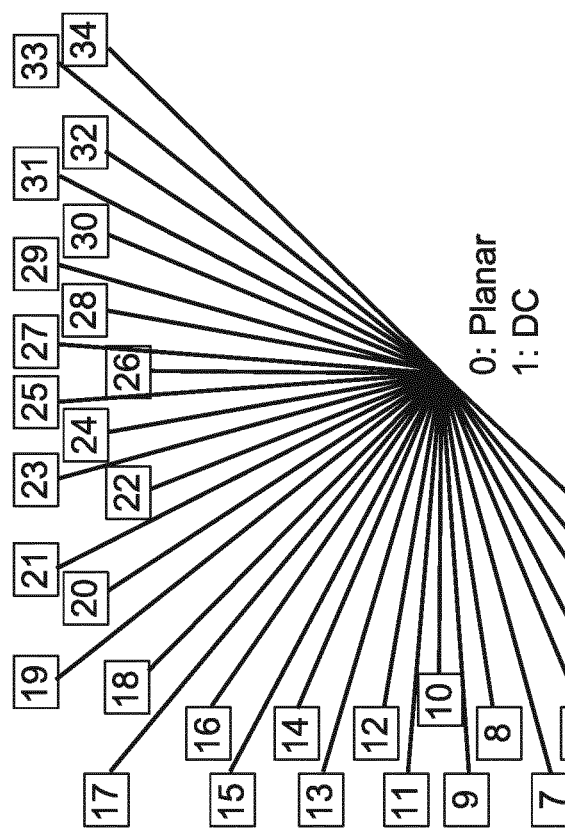
FIG. 6A shows a set of 35 intra prediction modes that are available in HEVC.

CUs in intra mode are predicted from reconstructed neighboring samples within the same slice. A set of 35 intra prediction modes is available in HEVC, including a DC, a planar and 33 angular prediction modes, as shown in FIG. 6A. The intra prediction reference is reconstructed from the row and column adjacent to the current block. The reference extends over two times the block size in horizontal and vertical direction using available samples from previously reconstructed blocks. When an angular prediction mode is used for intra prediction, reference samples can be copied along the direction indicated by the angular prediction mode as shown in an example in FIG. 6B. An angular prediction mode is also referred to as a directional prediction mode in the present application.

The applicable luma intra prediction mode for the current block can be coded using two different options. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

For an inter CU, the corresponding coding block is further partitioned into one or more prediction blocks. Inter prediction is performed on the PB level, and the corresponding PU contains the information about how inter prediction is performed.

The motion information (i.e., motion vector and reference picture index) can be signaled in two methods, namely, "merge mode" and "advanced motion vector prediction (AMVP)."

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

In AMVP, a video encoder or decoder assembles candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD.

In HEVC, the precision of the motion information for motion compensation is one quarter-sample (also referred to as quarter-pel or ¼-pel) for the luma component and one eighth-sample (also referred to as ⅛-pel) for the chroma components. A 7-tap or 8-tap interpolation filter is used for interpolation of fractional-sample positions, i.e., ¼, ½ and ¾ of full sample locations in both horizontal and vertical directions can be addressed for luma.

The prediction residuals are then transformed (525) and quantized (530). The quantized transform coefficients, as well as motion vectors and other syntax elements, are entropy coded (545) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (540) and inverse transformed (550) to decode prediction residuals. Combining (555) the decoded prediction residuals and the predicted block, an image block is reconstructed. In-loop filters (565) are applied to the reconstructed picture, for example, to perform deblocking/SAO filtering to reduce encoding artifacts. The filtered image is stored at a reference picture buffer (580).

Figure 7:
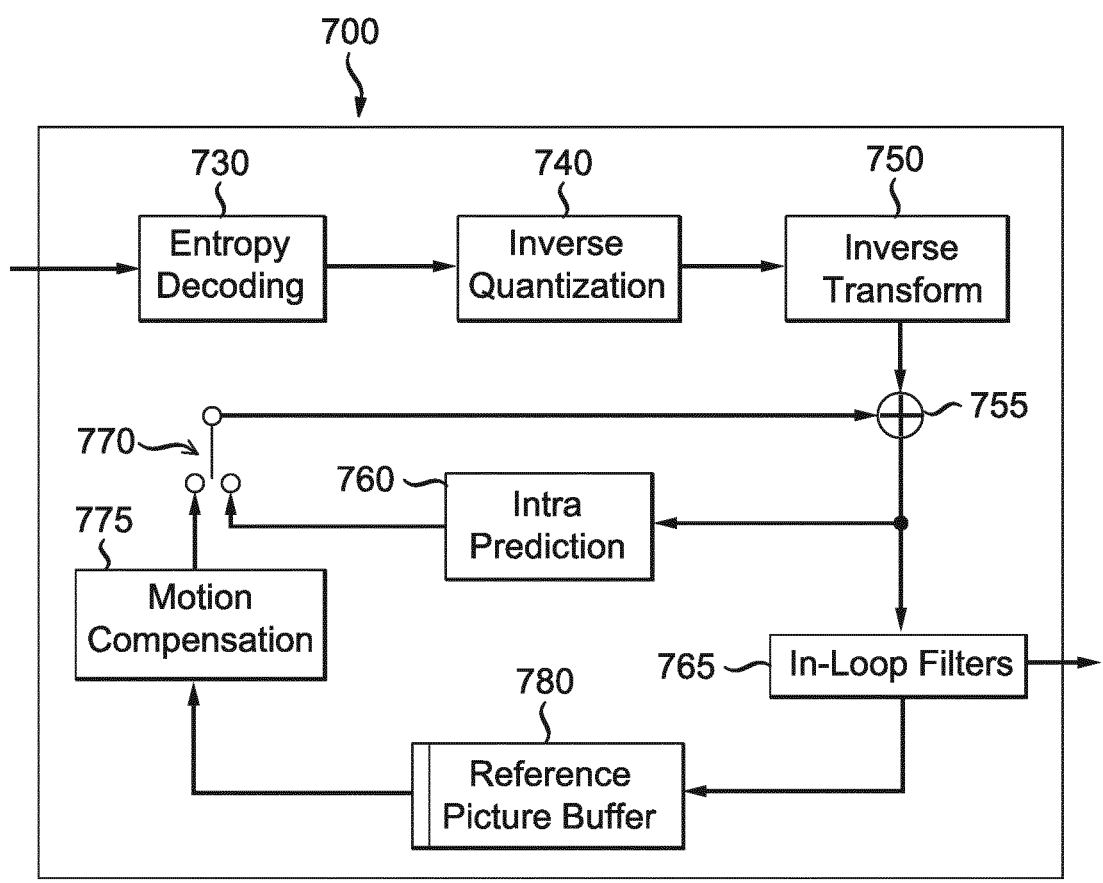
FIG. 7 illustrates a block diagram of an exemplary HEVC video decoder.

FIG. 7 illustrates a block diagram of an exemplary HEVC video decoder 700. In the exemplary decoder 700, a bitstream is decoded by the decoder elements as described below. Video decoder 700 generally performs a decoding pass reciprocal to the encoding pass as described in FIG. 5, which performs video decoding as part of encoding video data.

In particular, the input of the decoder includes a video bitstream, which may be generated by video encoder 500. The bitstream is first entropy decoded (730) to obtain transform coefficients, motion vectors, and other coded information. The transform coefficients are de-quantized (740) and inverse transformed (750) to decode the prediction residuals. Combining (755) the decoded prediction residuals and the predicted block, an image block is reconstructed. The predicted block may be obtained (770) from intra prediction (760) or motion-compensated prediction (i.e., inter prediction) (775). As described above, AMVP and merge mode techniques may be used to derive motion vectors for motion compensation, which may use interpolation filters to calculate interpolated values for sub-integer samples of a reference block. In-loop filters (765) are applied to the reconstructed image. The filtered image is stored at a reference picture buffer (780).

Figure 6B:
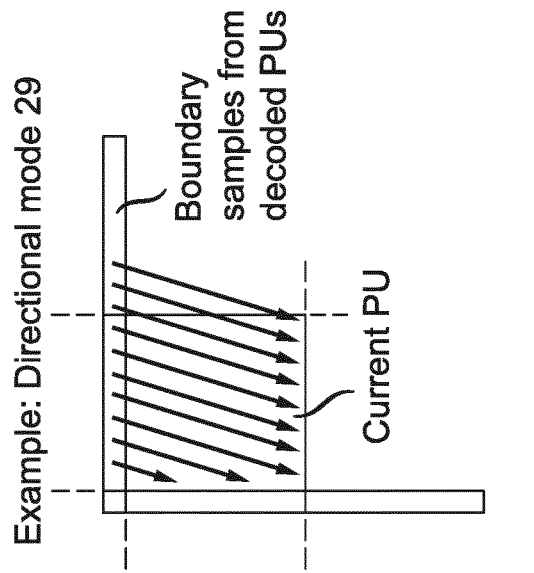
FIG. 6B shows that reference samples are copied along the direction indicated by the angular prediction mode.

As shown in FIG. 6A and FIG. 6B, intra prediction makes use of pixels within a causal shape of previously reconstructed reference pixels to predict the current blocks, for instance, reference pixels can be copied along a direction as shown in FIG. 6B.

The intra rectilinear propagation modes are good at approximating lots of rigid straight textures in images and videos (e.g., buildings, objects containing straight edges). Therefore, the directional modes are usually efficient when the image content distribution, over the prediction block, presents a main direction. However, for short focal length images or images warped from a spherical surface as in the equi-rectangular mapped content, the objects may be distorted and main directions are more likely to follow non-straight curves, due to the mapping or perspective distortion.

Figure 8:
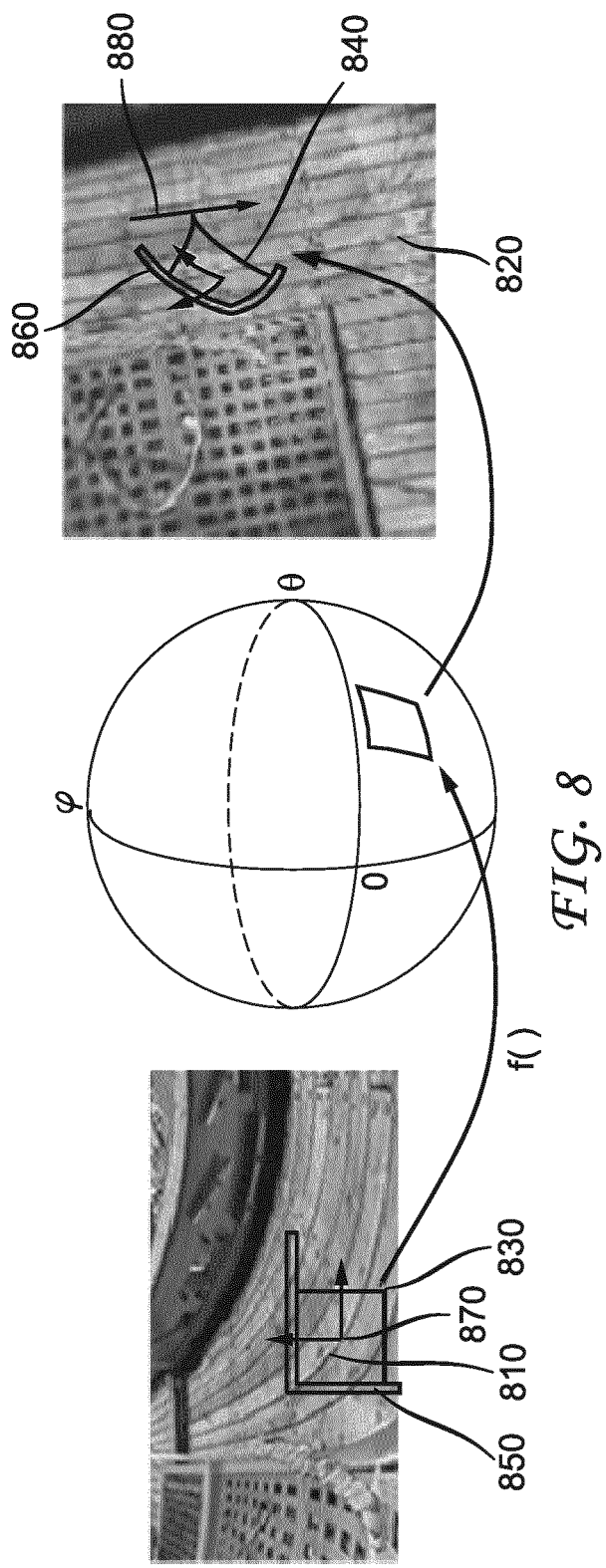
FIG. 8 illustrates an example wherein a straight line in the rendered frame is not seen as a straight line in the frame to be encoded.

FIG. 8 illustrates an example wherein a straight line (820) in the rendered frame is not seen as a straight line (810) in the frame to be encoded. In particular, FIG. 8 illustrates local mapping and rendering of a current prediction block (830) and the corresponding reference samples (850). In the local mapping and rendering, only a small portion around the prediction block is mapped to the rendered version. The left image is a cropped portion of an exemplary equi-rectangular frame F to be encoded. The right image is a cropped portion in the exemplary rendered frame to illustrate a local rendered version (840) of the prediction block. Neighboring samples (850) of the prediction block (830) in the equi-rectangular frame are mapped to neighboring area (860) in the rendered frame G. The frame of reference (870) is centered at the center of the prediction block. The arrow (880) shows a possible directional mode might be chosen by a traditional encoder if the rendered version is encoded.

Because the straight lines are no longer straight in the prediction block (830), the directional intra prediction as defined in HEVC may not be very efficient for a block with non-straight curves in the equi-rectangular content.

We propose to adapt intra prediction for omnidirectional videos to improve the compression efficiency. Particularly, we may choose the intra predictor, namely, the reference sample that is copied along the selected direction to predict a pixel in the prediction block, by taking into account the modified geometry, for example, those of the equi-rectangular image to be coded to improve intra prediction.

In one embodiment, the prediction block in the 2D frame F is mapped to the rendering space. Then a reference sample is computed for a pixel in a block in the rendering space, corresponding to the prediction block in the 2D frame, based on a straight line intra prediction direction. Then we can locate the reference sample in the 2D frame, corresponding to the reference sample in the rendering space.

The reference sample may be at an integer-sample position, or at a fractional-sample position. For a fraction-sample reference sample, interpolation can be applied as in the case for straight directional modes. Moreover, the reference samples can be pre-filtered using a low-pass kernel in order to propagate a smoother signal which is more likely to provide a better predictor.

Figure 9:
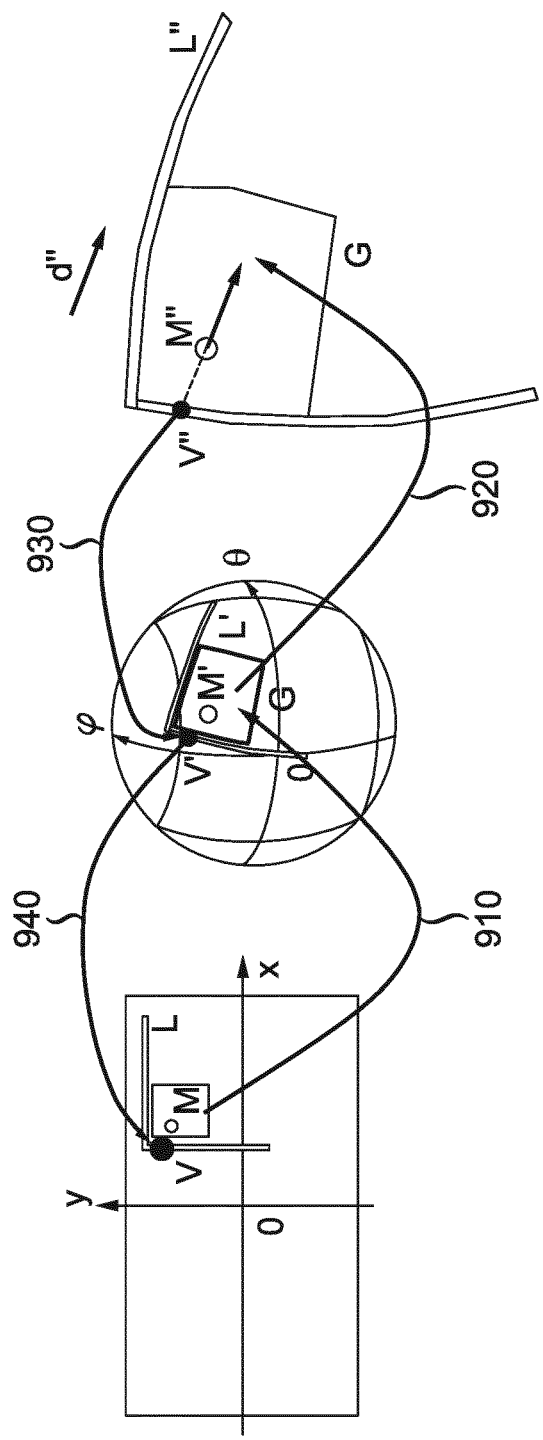
FIG. 9 illustrates an exemplary implementation for locating an intra predictor, according to an embodiment of the present principles.

Without loss of generality, we consider the local rendering of a prediction block, with a frame of reference at the center of the prediction block. As shown in FIG. 9, samples L around the current prediction block are projected to samples L" in the rendered frame G, and the current block is projected to a rendered block, a patch tangent to the 3D rendering surface S at the center of the current block.

Figure 10:
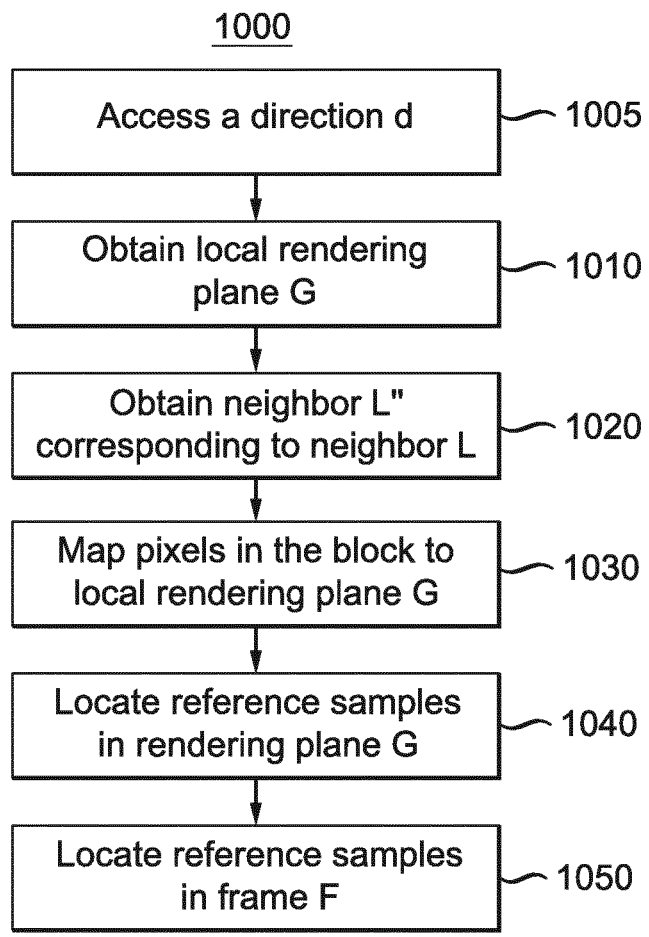
FIG. 10 illustrates an exemplary method for locating intra predictors for intra prediction, according to an embodiment of the present principles.

FIG. 10 illustrates an exemplary method 1000 for locating intra predictors for intra prediction, according to an embodiment of the present principles. Because intra prediction is performed at both the encoder and decoder, method 1000 can be used at both the encoder and decoder. For ease of notation, we use a "coder" to refer to either an encoder or a decoder. As in HEVC, a single intra prediction is accessed (1005) for an intra prediction block B. At step 1010, a coder computes (910) P' and then $P^{3d}$ for the center P of the block B:

$$P'=f(P), P^{3d}=3d(P') \quad (8)$$

The coder then obtains (920) the plane G tangent to the surface at the point $P^{3d}$ of the block B. By construction Proj: $P^{3d} \rightarrow P''=[0\ 0]$.

For the causal neighborhood L around the block B, the coder computes (1020) corresponding neighbor L', $L^{3d}$ and the projection L" on the plane G:

$$\forall N \in L, N'=f(N), N^{3d}=3d(N'), N''=Proj(N^{3d}) \quad (9)$$

For a pixel M of the current block B, the coder computes (1030, 910) M' and then $M^{3d}$. The point on the 3D surface, $M^{3d}$, is then projected (920) onto the plane G at point M":

$$M''=Proj(M^{3d}) \quad (10)$$

For a direction d" to be tested at the encoder, or decoded from the bitstream at the decoder, for the point M", the coder locates (1040) the intersection of the straight line that passes through point M" at direction d", M"+a*d", with the projected neighbor L" at V":

$$V''=(M''+ad'') \cap L'' \quad (11)$$

The direction d" as in Eq. (11) is a direction in the rendering space, and can be derived from a direction d in the 2D encoding or decoding frame. To compute the direction d", a coder can compute Q' and then $Q^{3d}$ for pixel Q=P+∈d, where ∈ is a small step:

$$Q'=f(P+\in d), Q^{3d}=3d(Q'), \quad (12)$$

and project $Q^{3d}$ onto the plane G at point Q"

$$Q''=Proj(Q^{3d}) \quad (13)$$

Then the direction d" can be computed as:

$$d''=Q''-P'' \quad (14)$$

The same direction d" can be applied to all pixels M" in the rendered frame G. One advantage of this approach is that the pattern inside the block is consistent for the whole block.

To locate the reference pixel in the frame to be encoded or decoded, V" is projected (930) back onto the surface in $V^{3d}$ and then to V':

$$V^{3d}=proj^{-1}(V''), V'=3d^{-1}(V^{3d}) \quad (15)$$

Then the coordinate of V is computed (940) as the inverse image of V' in the frame F $$V=f^{-1}(V') \quad (16)$$

The resulting point V is then used (1050) as an intra predictor for pixel M at direction d.

For a pixel of a block, given the position of the pixel and a direction d, the intra predictors can be pre-computed and the result can be stored in a look-up table (LUT). When using a look-up table, method 1000 can be simplified. For example, steps 1010-1040 can be replaced by accessing the look-up table, and at step 1050, reference sample for a particular location in the prediction block can be located based on the look-up table.

Figures 11A, 11B:
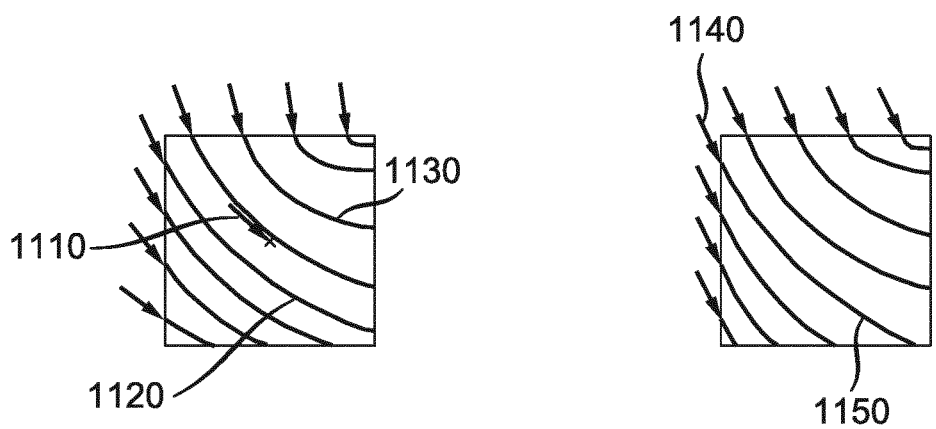
FIG. 11A shows an example of curves derived for a particular direction at the center of the block, depicted with an arrow.
FIG. 11B shows another examples of intra prediction along curves.

The new intra prediction can be seen as predicting samples within the block along non-straight curves (or deformed curves) derived based on the intra prediction direction for the block. The deformed curves can be computed by setting the frame of reference at a specific location (also referred to as an "anchor point"), for instance the center of the prediction block or its left corner. The anchor point used to derive the direction d" can also be chosen from another point, for example the top-left corner. FIG. 11A shows an example of curves derived for a particular direction d at the center of the block, depicted with an arrow (1110).

Here, the reference sample in the local rendered frame G is selected based on a straight line, where the rectilinear propagation modes are more likely to work than in the 2D encoding or decoding frame. The reference samples selected based on the inverse mapping would reflect the deformation caused by the mapping. As shown in FIG. 11A, direction d as indicated by the arrow (1110) would be adapted to the non-straight curves (1120, 1130) to reflect the new intra prediction direction. In this embodiment, both the reference samples and the direction at reference samples are adapted. The direction in frame G are the same for all reference samples, and thus different in frame F.

In the above, we convert direction d in frame F to direction d" in the rendered frame G in order to perform the straight line intersection. In another embodiment, the direction d can be expressed directly in G, i.e., to encode directly d" as the direction of prediction of the current block. In this case, the choice of local rendered frame G should be known and synchronized between the encoder and the decoder.

In another embodiment, we may approximate the directions along the reference samples and apply the directional mode directly in the equi-rectangular domain. Here, the curves are parallel at reference sample locations and then deformed depending on the mapping function, as shown in an example in FIG. 11B. In this case, the directions at reference samples are the same in the frame F but different in frame G.

In this embodiment, the direction of prediction is expressed in the frame F for an individual pixel M. Thus, in order to compute the direction on prediction d" in the local rendered frame G, a coder may compute N' and then $N^{3d}$ for N=M+∈d where ∈ is a small step for a pixel of the block:

$$N'=f(M+\in d), N^{3d}=3d(N'), \quad (17)$$

and then project $N^{3d}$ onto the plane G at point N"

$$N''=\text{Proj}(N^{3d}) \quad (18)$$

The direction d" can be computed at M":

$$d''=N''-M'' \quad (19)$$

Because d" varies with the position of pixel M", directions d" in the rendered frame G for different samples are not the same.

Figure 12:
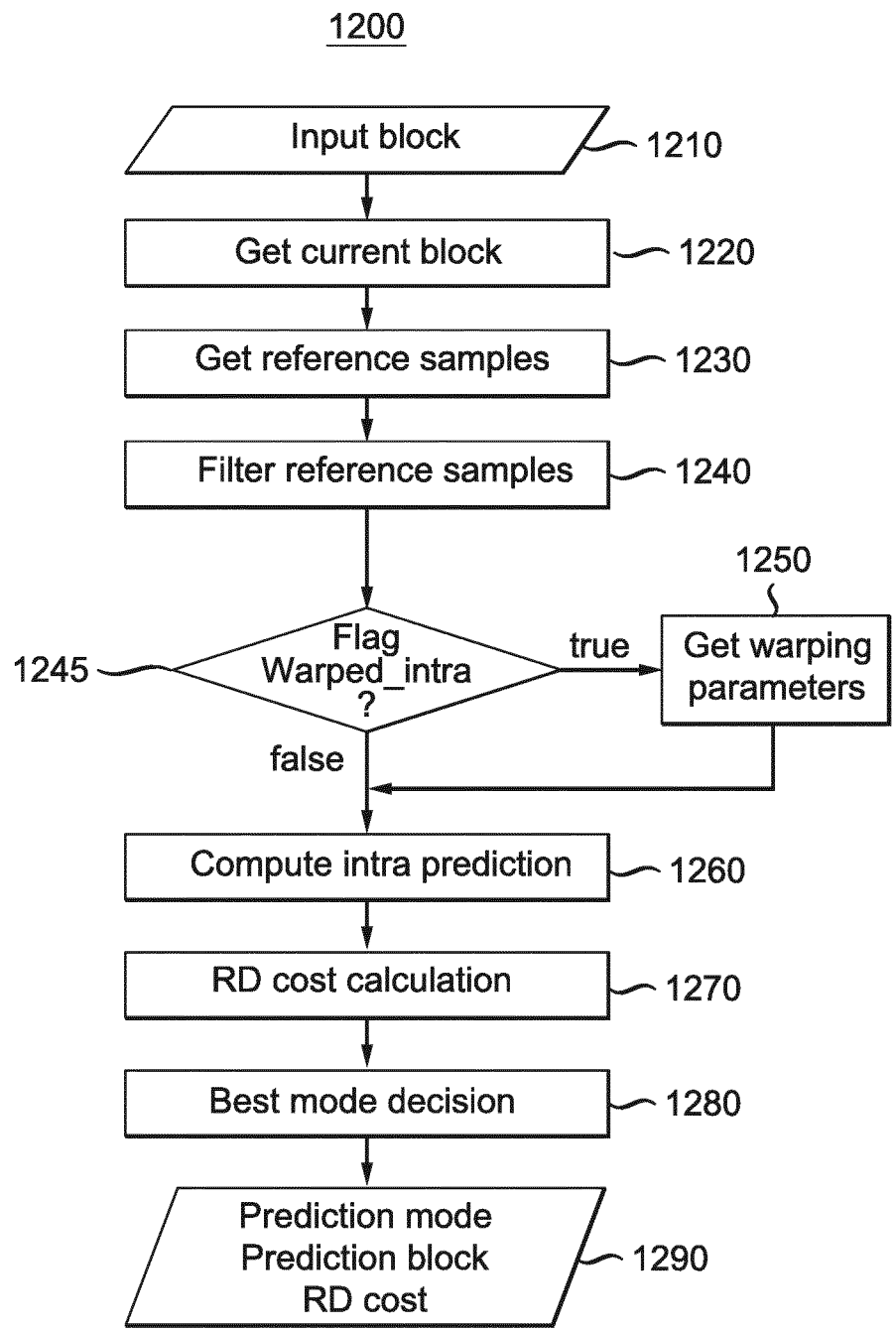
FIG. 12 shown an exemplary method for performing intra prediction adapted to omnidirectional videos at the encoder side, according to an exemplary embodiment of the present principles.

FIG. 12 shown an exemplary method 1200 for performing intra prediction adapted to omnidirectional videos at the encoder side, according to an exemplary embodiment of the present principles. The encoder accepts an image block (1210) as input. The encoder may also get user input, for example, flag warped_intra indicating whether or not to use intra prediction adapted for omnidirectional videos.

After getting (1220) the block, the encoder determines (1230) which neighboring samples are to be used as reference samples for intra prediction. The reference samples may be filtered (1240) to smooth the content in order to improve intra prediction or interpolated to obtain the fractional-sample positions. If a flag, warped_intra (1245), is true, then the encoder enables the new curve directions. In particular, the encoder may get (1250) warping parameters, for example, as a pre-defined LUT, or the mapping parameters for computing the functions "f( )" "proj( )," or "3d( )" as described above, to provide the new directions. The new directions are used to perform (1260) intra prediction. RD (Rate-Distortion) cost can be calculated (1270) for the block. The encoder decides (1280) the best prediction mode to use, based on the intra prediction or other tested inter prediction modes. The selected prediction mode for, the prediction block, and the RD cost can be output (1290). The encoder may loop over the blocks in the image as necessary. If the encoder chooses the new intra direction, then the encoder performs intra prediction using the new intra direction to form a predicted block, and encodes the new intra mode and the prediction residue (i.e., the difference between the current prediction block and the predicted block) for the current block.

At the decoder side, if warped_intra flag is set to true, the new intra prediction mode may be chosen based on which prediction mode is set. If the new intra prediction is chosen, the decoder proceeds to decode the block based on the new intra prediction mode, for example, as described above.

Signaling

According to a first embodiment, the decoder is dedicated to a certain type of omnidirectional video contents. The mapping function is activated by default, namely, a block will be always predicted using "curved" lines using one of the methods described above.

According to a second embodiment, the decoder may adapt to different layouts. The decoder receives an index of the current layout via high level syntax. Then a block is to be predicted using "curved" lines using one of the above methods, according to the signaled mapping function.

According to another embodiment, the mapping functions can be transmitted, the decoder recreates the corresponding directions. Then a block is to be predicted using "curved" lines using one of the above methods, according to the transmitted mapping functions.

According to another embodiment, the mapping functions are directly signaled at the block, slice, or sequence level.

According to another embodiment, the deformation parameters are transmitted as a dictionary defined at the block, slice or sequence level.

The particular layout chosen to map the frame to be encoded to the sphere is usually fixed by sequence and can be signaled at the sequence level, for example, in the SPS (Sequence Parameter Set).

Regarding the mapping function, several ways of retrieving information can be used.

A look-up table can be implemented at the decoder side, to signal deformations all over the equi-rectangular frame. Here, the decoder or encoder does not need to perform the projection in between the 2D frame F and the rendered frame G during intra prediction, and the deformations are directly applied to the frame F.

The decoder could recreate the projection on the frame G to apply the straight mode and then project back to the frame F.

Many mapping functions exist. The decoder could determine the main mapping functions based on an index, for example, transmitted in the bitstream via a parameter set, such as, Video parameter Set, Sequence parameter Set, Picture Parameter Set.

In addition to the mapping for omnidirectional videos described above, the deformations may also come from a short focal length. In this case, a global focal length value as well as necessary distortion parameters could be transmitted via high level syntax such as Video Parameter Set (VPS) or Sequence Parameter Set (SPS), which drives the whole sequence. If the focal length varies along the video, these values can be included in the picture parameter set. According to other embodiments, information can be transmitted at the slice or block level.

Other propagation methods exist such as DC mode that fills the prediction block with the average value of causal reference samples to form the predicted block. In this case, the new type of content does not modify the efficiency of mode. However, advanced techniques such as Planar Mode in H.265/HEVC, or Plane mode H.264/AVC, utilize the variations of pixel values among the reference samples to create a smooth prediction of the current block surface. For these modes, the equi-rectangular mapping could also reduce the efficiency of such modes.

Figure 13:
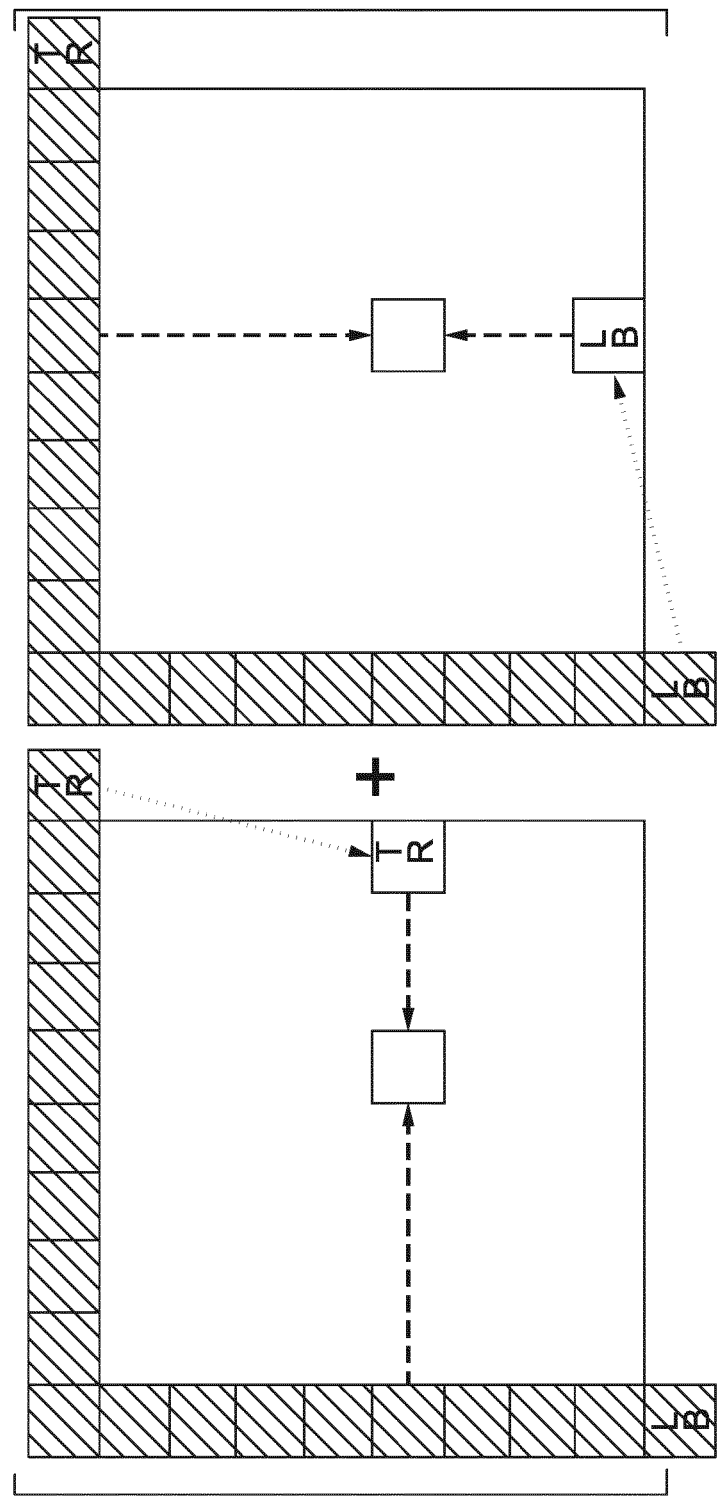
FIG. 13 illustrates the planar mode for HEVC.

For planar mode, a pixel value in the block to be predicted directly depends on four pixels as shown in an example in FIG. 13. To adapt the plane mode to omnidirectional videos, instead of relying on pixels from vertical and horizontal directions, the curves computed as explained above can be utilized to point at relevant reference pixel locations.

New tools utilize reference sample variations and fill the prediction block with improved methods such as the so-called PDPC for Position Dependent Intra Prediction Combination and MPI for Multi-parameter Intra Prediction. These modes can be adapted by pointing at pixels followings the deformation curves derived for the directional modes.

Figure 14:
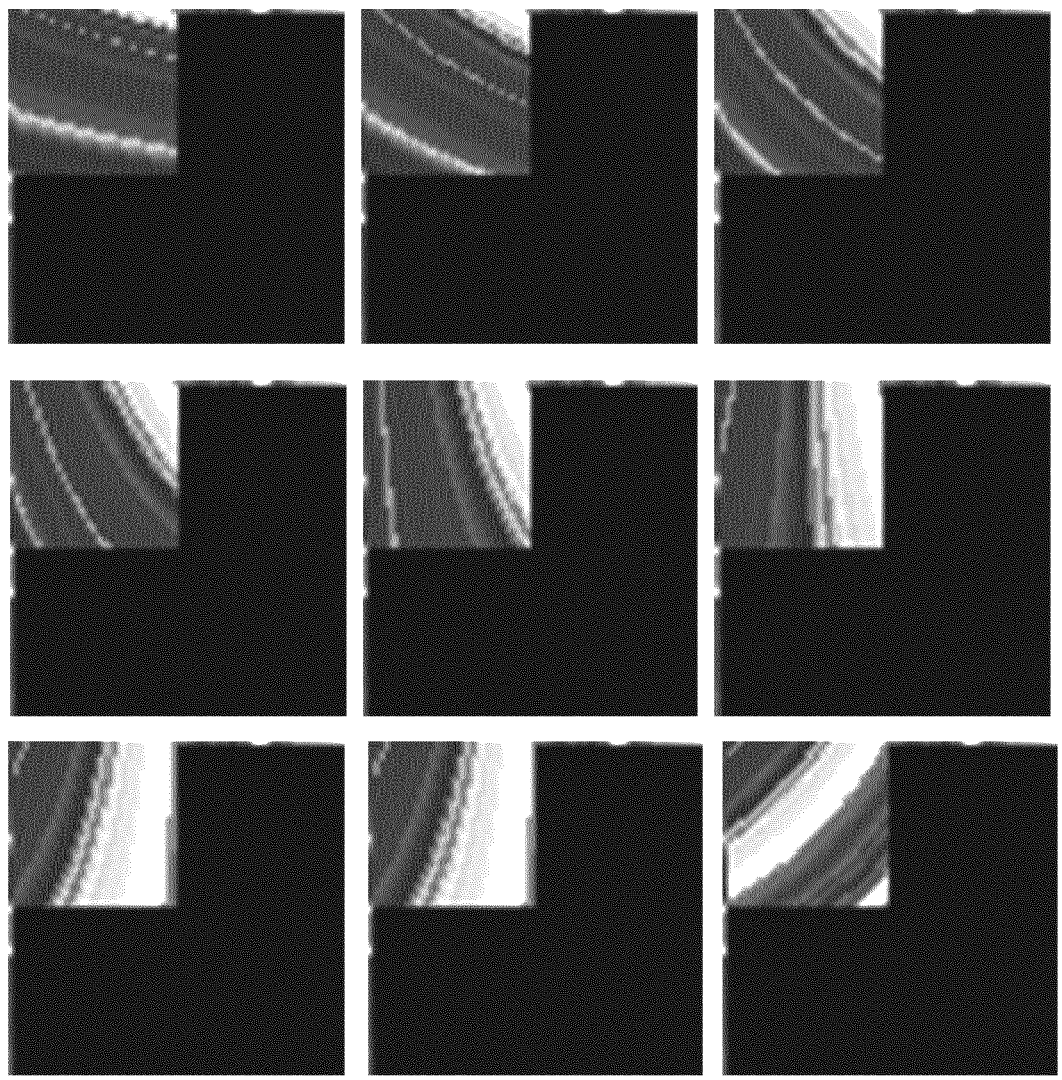
FIG. 14 shows an example of prediction using the proposed new directional intra modes for equi-rectangular mapping, for different prediction angles.

FIG. 14 shows an example of prediction using the proposed new directional intra modes for equi-rectangular mapping, for different prediction angles, −15°, −30°, −45°, −60°, −75°, −90°, −105°, −120°, −135° (0° corresponding to the horizontal direction), from top left to bottom right. The resulting predicted blocks are computed from an equi-rectangular frame at the location depicted in FIG. 15. One can notice that the curves are in line with the geometry of the equi-rectangular mapping.

Figures 15, 16:
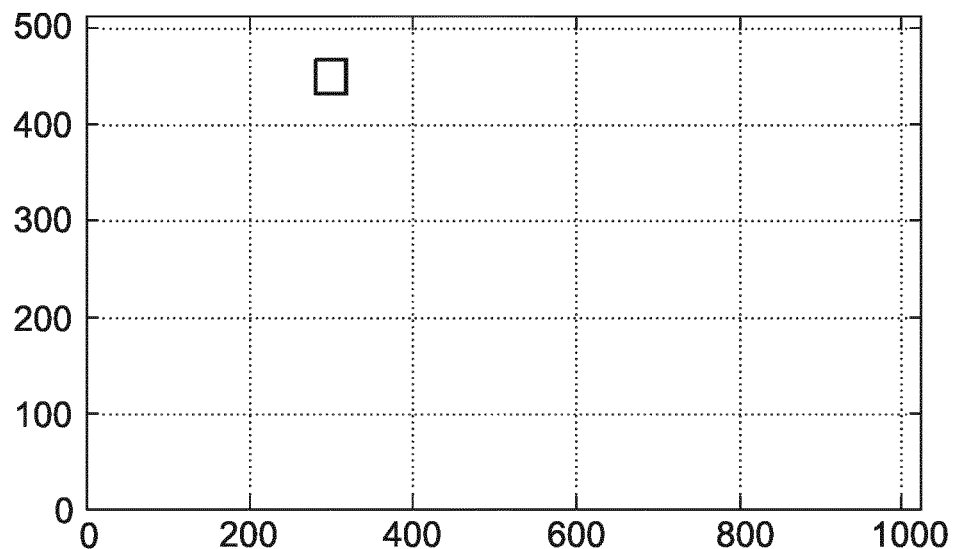
FIG. 15 shows an exemplary block in an equi-rectangular frame.
FIG. 16 shows positions of reference samples.

For individual pixels in the prediction block, the reference sample to copy from the L shape is given by the methods described above. If the mapping is fixed and known, a function or a LUT can be pre-computed to speed up the prediction process. TABLE 2 shows a portion of an exemplary LUT for a prediction angle of 45°, wherein an entry at (x,y) location in the LUT represents a position of the reference sample to use for the sample at (x,y) location in the block. Based on the LUT, the reference samples may be copied or propagated into corresponding sample locations in the prediction block to form a predicted block. The numbers representing the position of reference samples are depicted in FIG. 16. Negative values correspond to left reference sample and positive values correspond to top reference samples as depicted in FIG. 16.

The same look-up table may be used for different block sizes. The encoder or decoder may need only one look-up table in the maximum block size for a particular block location and direction, and a look-up table for a block smaller than the maximum block size can be obtained using the top-left portion of the LUT of the maximum size.

TABLE 2

| 0 | 1 | 2 | 3 | 4 | 5 | 6 | 7 | 8 | 9 | 10 | 11 | 12 |
|---|---|---|---|---|---|---|---|---|---|----|----|----|
| 0 | 1 | 2 | 3 | 4 | 5 | 6 | 7 | 8 | 9 | 10 | 11 | 12 |
| −1 | 0 | 1 | 2 | 3 | 4 | 5 | 6 | 7 | 8 | 9 | 10 | 11 |
| −2 | 0 | 1 | 2 | 2 | 3 | 4 | 5 | 6 | 7 | 8 | 9 | 10 |
| −3 | −1 | 0 | 1 | 2 | 3 | 4 | 5 | 6 | 6 | 7 | 8 | 9 |
| −4 | −2 | −1 | 0 | 1 | 2 | 3 | 4 | 5 | 6 | 7 | 8 | 9 |
| −5 | −3 | −2 | 0 | 1 | 1 | 2 | 3 | 4 | 5 | 6 | 7 | 8 |
| −6 | −4 | −3 | −1 | 0 | 1 | 2 | 3 | 3 | 4 | 5 | 6 | 7 |
| −7 | −5 | −4 | −2 | −1 | 0 | 1 | 2 | 3 | 4 | 5 | 5 | 6 |
| −8 | −6 | −5 | −3 | −2 | −1 | 0 | 1 | 2 | 3 | 4 | 5 | 6 |
| −9 | −7 | −6 | −4 | −3 | −2 | −1 | 1 | 1 | 2 | 3 | 4 | 5 |
| −10 | −8 | −7 | −5 | −4 | −3 | −2 | 0 | 1 | 2 | 2 | 3 | 4 |
| −11 | −9 | −8 | −6 | −5 | −4 | −3 | −1 | 0 | 1 | 2 | 3 | 3 |
| −12 | −10 | −9 | −7 | −6 | −5 | −4 | −2 | −1 | 0 | 1 | 2 | 3 |

For equi-rectangular mapping, the lookup tables might be described using only the vertical location of the block. Also, the lookup tables might be described only for the first half of the image, and the second half is deduced by minoring the indices for the first half of the image.

The correspondence between a location in the prediction block and a reference sample location can also be represented by an analytical function, for example, fitting the above LUT using a quadratic function. The fitting may not always be exact. The LUT or the analytical function can be derived or pre-computed at the encoder or decoder, given an intra prediction direction, the block location/size of a prediction block. Thus, the encoder still only needs to transmit a single directional mode for an intra prediction block, while the intra prediction may follow different deformed curves in the encoder or decoder for an intra prediction block.

The proposed methods rely on the generic principles of defining curved intra propagation instead of the straight directions classically used. According to some embodiments, the curvy propagations can be seen as new directional intra modes that are added to the existing ones. In other embodiments, they can replace corresponding intra modes in existing codecs.

For instance, quadratic curves can be added as another intra mode, depending on the type of video, the position and the size of the considered prediction block. In another example in which the video was shot with a wide angle/short focal length, some distortion may deform the straight lines. Cylindrical correction is sometimes used to reduce the distortion. In case the video is distorted, curvy intra prediction can often improve the compression efficiency by propagating reference pixels along deformed curves, especially on the borders.

For short focal length video, a classical model for distortion is to use the Brown-Conrady model where the 2D+3D distortions are merged into a simple 2D function: $(x_d, y_d) = g$ $(x_u, y_u, S)$, where $(x_d, y_d)$ is the pixel coordinate after distortion (in frame F) and $(x_u, y_u)$ is the pixels coordinate before distortion (in frame G). The distortion function g( ) is the composition: $g = f^{-1} \circ 3d^{-1} \circ proj^{-1}$. The distortion function g( ) may be obtained using Brown-Conrady model.

The function $g^{-1}$ can be recovered from g, usually as an offline process where a pixel is mapped to a corresponding undistorted pixel, and apply to the above embodiments. The inverse function $g^{-1}$ may not always be analytically invertible and can be found using numerical methods or using an LUT.

It should be noted that in the present embodiments, a single intra prediction direction is transmitted for a prediction block. Based on the single direction, the encoder or decoder can derive the deformed curves, as shown in FIGS. 11A and 11B, to be used for intra prediction based on the location of the block and the mapping as described above. Since the location of block is already indicated in the bitstream, no additional syntax is needed for the location of the block. The mapping typically does not change often. Thus, the mapping can be transmitted at a picture level, sequence level or video level, which should incur only a very small overhead. Thus, the present embodiments are more efficient than encoding the parameters for the curves, along which the intra prediction may be performed, since the parameters for the curves may need to be transmitted at the block level.

In the above, we describe various embodiments using an equi-rectangular mapping, i.e., the 3D surface is considered to be a sphere, for omnidirectional videos. It should be noted that the present principles can be applied to other 3D surfaces with convex surfaces, and to other types of videos, for example, but not limited to, planar images acquired with very large field of view (very small focal length like fish eye lens). More generally, the present principles may be applied to images/videos that contain distorted content, which can be due to the mapping of a surface to a planar frame to be encoded or a scene captured with a very short focal length, which tends to bend the images close to the borders.

Figure 17:
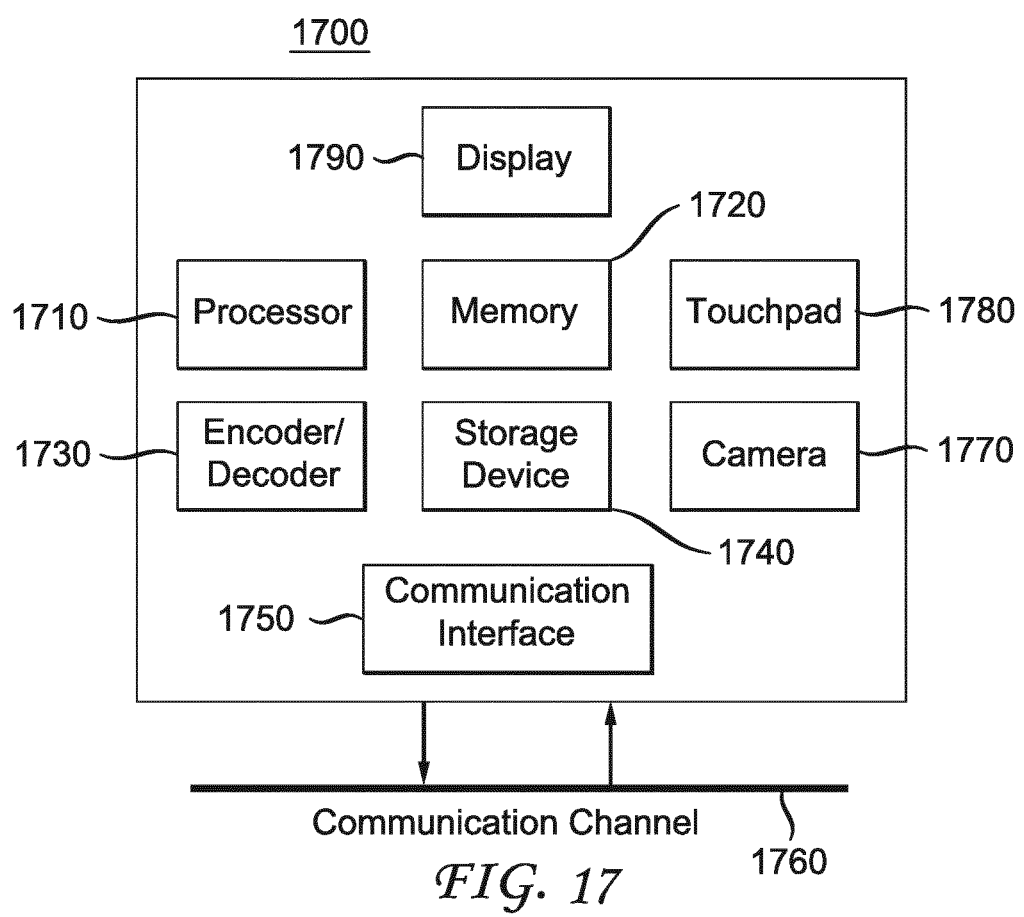
FIG. 17 illustrates a block diagram of an exemplary system in which various aspects of the exemplary embodiments of the present principles may be implemented.

FIG. 17 illustrates a block diagram of an exemplary system 1700 in which various aspects of the exemplary embodiments of the present principles may be implemented. System 1700 may be embodied as a device including the various components described below and is configured to perform the processes described above. Examples of such devices, include, but are not limited to, HMDs, personal computers, laptop computers, smartphones, tablet computers, digital multimedia set top boxes, digital television receivers, personal video recording systems, connected home appliances, and servers. System 1700 may comprise sensors, and may be communicatively coupled to other similar systems via a communication channel as shown in FIG. 17 and as known by those skilled in the art to implement the exemplary video system described above.

The system 1700 may include at least one processor 1710 configured to execute instructions loaded therein for implementing the various processes as discussed above. Processor 1710 may include embedded memory, input output interface and various other circuitries as known in the art. The system 1700 may also include at least one memory 1720 (e.g., a volatile memory device, a non-volatile memory device). System 1700 may additionally include a storage device 1740, which may include non-volatile memory, including, but not limited to, EEPROM, ROM, PROM, RAM, DRAM, SRAM, flash, magnetic disk drive, and/or optical disk drive. The storage device 1740 may comprise an internal storage device, an attached storage device and/or a network accessible storage device, as non-limiting examples. System 1700 may also include an encoder/decoder module 1730 configured to process data to provide an encoded video or decoded video.

Encoder/decoder module 1730 represents the module(s) that may be included in a device to perform the encoding and/or decoding functions. Encoder 500 and decoder 700 may be used in encoder/decoder module 1730. As is known, a device may include one or both of the encoding and decoding modules. Additionally, encoder/decoder module 1730 may be implemented as a separate element of system 1700 or may be incorporated within processors 1710 as a combination of hardware and software as known to those skilled in the art.

System 1700 may further include a display (1790) or may be communicatively coupled to the display via the communication channel. The display is, for example of OLED or LCD type. The display can also be an immersive (projective) wall, which is usually of a huge size.

System 1700 may further comprise a touch surface 1780 (e.g. a touchpad or a tactile screen) and a camera 1770. Processor 1710 may process signals received from sensors, which may or may not be part of system 1700. Some of the measurements from sensors can be used to compute the pose of system 1700 or of another device connected to system 1700. Camera 1770 may capture images of the environment for image processing. Processor 1710 may also perform the pre-processing and post-processing functions as described in FIG. 1.

Program code to be loaded onto processors 1710 to perform the various processes described hereinabove may be stored in storage device 1740 and subsequently loaded onto memory 1720 for execution by processors 1710. In accordance with the exemplary embodiments of the present principles, one or more of the processor(s) 1710, memory 1720, storage device 1740 and encoder/decoder module 1730 may store one or more of the various items during the performance of the processes discussed herein above, including, but not limited to the input video, the bitstream, equations, formula, matrices, variables, operations, and operational logic.

The system 1700 may also include communication interface 1750 that enables communication with other devices via communication channel 1760. The communication interface 1750 may include, but is not limited to a transceiver configured to transmit and receive data from communication channel 1760. The communication interface may include, but is not limited to, a modem or network card and the communication channel may be implemented within a wired and/or wireless medium. The various components of system 1700 may be connected or communicatively coupled together using various suitable connections, including, but not limited to internal buses, wires, and printed circuit boards.

The exemplary embodiments according to the present principles may be carried out by computer software implemented by the processor 1710 or by hardware, or by a combination of hardware and software. As a non-limiting example, the exemplary embodiments according to the present principles may be implemented by one or more integrated circuits. The memory 1720 may be of any type appropriate to the technical environment and may be implemented using any appropriate data storage technology, such as optical memory devices, magnetic memory devices, semiconductor-based memory devices, fixed memory and removable memory, as non-limiting examples. The processor 1710 may be of any type appropriate to the technical environment, and may encompass one or more of microprocessors, general purpose computers, special purpose computers and processors based on a multi-core architecture, as non-limiting examples.

Various methods are described above, and each of the methods comprises one or more steps or actions for achieving the described method. Unless a specific order of steps or actions is required for proper operation of the method, the order and/or use of specific steps and/or actions may be modified or combined.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for encoding video data, comprising:
  accessing a directional mode for intra prediction for a first block of a 2D picture, the 2D picture represented in a first format suitable for encoding, wherein the picture is for rendering in a second format which corresponds to a projection from a 3D surface on which the 2D picture is mapped;
  determining a look-up table (LUT) from among a plurality of look-up tables (LUTs) based on the directional mode, wherein the plurality of look-up tables respectively correspond to a plurality of directional modes;
  determining a plurality of reference samples in reconstructed blocks adjacent to the first block;
  accessing a portion of the LUT based on a location of the first block and forming a predicted block for the first block based on the portion of the LUT, wherein a plurality of entries of the portion of the LUT correspond to a plurality of sample locations of the predicted block, wherein the plurality of entries represent a plurality of non-straight curves in the 2D picture along which the reference samples are propagated to the sample locations of the predicted block to form the predicted block, and wherein the non-straight curves in the 2D picture map to straight lines in the projection of the 2D picture;
  encoding the directional mode; and
  encoding a difference between the first block and the predicted block.

2. The method of claim 1, wherein a mapping between the first format and the second format is signaled in a bitstream.

3. The method of claim 1, wherein the accessing of the portion of the LUT is based on the location of the first block in a vertical direction of the 2D picture.

4. The method of claim 1, wherein the respective entries of the LUT for a first half of the 2D picture are mirrored for a second half of the 2D picture.

5. The method of claim 1, wherein the accessing of the portion of the LUT is based on a size of the first block and the location of the first block in a vertical direction of the 2D picture.

6. The method of claim 1, wherein respective values of the plurality of entries indicate whether the reference samples are in the reconstructed blocks left of the first block or above the first block.

7. The method of claim 1, wherein a mapping between the first format and the second format is signaled in a bitstream.

8. An apparatus for encoding video data, comprising one or more processors configured to:
  access a directional mode for intra prediction for a first block of a 2D picture, the 2D picture represented in a first format suitable for encoding, wherein the picture is for rendering in a second format which corresponds to a projection from a 3D surface on which the 2D picture is mapped;
  determine a look-up table (LUT) from among a plurality of look-up tables (LUTs) based on the directional mode, wherein the plurality of look-up tables respectively correspond to a plurality of directional modes;
  determine a plurality of reference samples in reconstructed blocks adjacent to the first block;
  access a portion of the LUT based on a location of the first block and forming a predicted block for the first block based on the portion of the LUT, wherein a plurality of entries of the portion of the LUT correspond to a plurality of sample locations of the predicted block, wherein the plurality of entries represent a plurality of non-straight curves in the 2D picture along which the reference samples are propagated to the sample locations of the predicted block to form the predicted block, and wherein the non-straight curves in the 2D picture map to straight lines in the projection of the 2D picture;
  encode the directional mode; and
  encode a difference between the first block and the predicted block.

9. The apparatus of claim 8, wherein a mapping between the first format and the second format is signaled in a bitstream.

10. The apparatus of claim 8, wherein the accessing of the portion of the LUT is based on the location of the first block in a vertical direction of the 2D picture.

11. The apparatus of claim 8, wherein the respective entries of the LUT for a first half of the 2D picture are mirrored for a second half of the 2D picture.

12. The apparatus of claim 8, wherein the accessing of the portion of the LUT is based on a size of the first block and the location of the first block in a vertical direction of the 2D picture.

13. The apparatus of claim 8, wherein respective values of the plurality of entries indicate whether the reference samples are in the reconstructed blocks left of the first block or above the first block.

14. A method for decoding video data, comprising:
  accessing a directional mode for intra prediction for a first block of a 2D picture, the 2D picture represented in a first format for decoder output, wherein a decoded version of the picture is for rendering in a second format which corresponds to a projection from a 3D surface on which the 2D picture is mapped;
  determining a look-up table (LUT) from among a plurality of look-up tables (LUTs) based on the directional mode, wherein the plurality of look-up tables respectively correspond to a plurality of directional modes;
  determining a plurality of references samples in decoded blocks adjacent to the first block;
  accessing a portion of the LUT based on a location of the first block and forming a predicted block for the first block based on the portion of the LUT, wherein a plurality of entries of the portion of the LUT correspond to a plurality of sample locations of the predicted block, wherein the plurality of entries represent a plurality of non-straight curves in the 2D picture along which the reference samples are propagated to the sample locations of the predicted block to form the predicted block, and wherein the non-straight curves in the 2D picture map to straight lines in the projection of the 2D picture; and
  decoding the first block using the predicted block.

15. The method of claim 14, wherein the accessing of the portion of the LUT is based on the location of the first block in a vertical direction of the 2D picture.

16. The method of claim 14, wherein the respective entries of the LUT for a first half of the 2D picture are mirrored for a second half of the 2D picture.

17. The method of claim 14, wherein the accessing of the portion of the LUT is based on a size of the first block and the location of the first block in a vertical direction of the 2D picture.

18. The method of claim 14, wherein respective values of the plurality of entries indicate whether the reference samples are in the reconstructed blocks left of the first block or above the first block.

19. An apparatus for decoding video data, comprising one or more processors configured to:
   access a directional mode for intra prediction for a first block of a 2D picture, the 2D picture represented in a first format for decoder output, wherein a decoded version of the picture is for rendering in a second format which corresponds to a projection from a 3D surface on which the 2D picture is mapped;
   determine a look-up table (LUT) from among a plurality of look-up tables (LUTs) based on the directional mode, wherein the plurality of look-up tables respectively correspond to a plurality of directional modes;
   determine a plurality of references samples in decoded blocks adjacent to the first block;
   access a portion of the LUT based on a location of the first block and form a predicted block for the first block based on the portion of the LUT, wherein a plurality of entries of the portion of the LUT correspond to a plurality of sample locations of the predicted block, wherein the plurality of entries represent a plurality of non-straight curves in the 2D picture along which the reference samples are propagated to the sample locations of the predicted block to form the predicted block, and wherein the non-straight curves in the 2D picture map to straight lines in the projection of the 2D picture;
   decode the first block using the predicted block.

20. The apparatus of claim 19, wherein a mapping between the first format and the second format is signaled in a bitstream.

21. The apparatus of claim 19, wherein the accessing of the portion of the LUT is based on the location of the first block in a vertical direction of the 2D picture.

22. The apparatus of claim 19, wherein the respective entries of the LUT for a first half of the 2D picture are mirrored for a second half of the 2D picture.

23. The apparatus of claim 19, wherein the accessing of the portion of the LUT is based on a size of the first block and the location of the first block in a vertical direction of the 2D picture.

24. The apparatus of claim 19, wherein respective values of the plurality of entries indicate whether the reference samples are in the reconstructed blocks left of the first block or above the first block.

* * * * *